US012224866B2

(12) United States Patent
Papasakellariou

(10) Patent No.: US 12,224,866 B2
(45) Date of Patent: Feb. 11, 2025

(54) MULTIPLEXING UNICAST AND MULTICAST CONTROL INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 369 days.

(21) Appl. No.: 17/650,363

(22) Filed: Feb. 8, 2022

(65) Prior Publication Data

US 2022/0263603 A1 Aug. 18, 2022

Related U.S. Application Data

(60) Provisional application No. 63/296,722, filed on Jan. 5, 2022, provisional application No. 63/152,696, filed
(Continued)

(51) Int. Cl.
*H04L 1/1812* (2023.01)
*H04L 1/00* (2006.01)
*H04L 5/00* (2006.01)

(52) U.S. Cl.
CPC .......... *H04L 1/1812* (2013.01); *H04L 1/0004* (2013.01); *H04L 1/0009* (2013.01); *H04L 5/0055* (2013.01)

(58) Field of Classification Search
CPC ... H04L 1/1812; H04L 1/0004; H04L 1/0009; H04L 5/0055; H04L 1/0031;
(Continued)

(56) References Cited

U.S. PATENT DOCUMENTS

2015/0003353 A1 1/2015 Yang et al.
2018/0115404 A1 4/2018 Park
(Continued)

FOREIGN PATENT DOCUMENTS

WO 2019138023 A1 7/2019

OTHER PUBLICATIONS

3GPP TSG RAN WG1#100; R1-2000311; Source: vivo; Title: Remaining issues on HARQ operation for NR-U; e-Meeting, Feb. 24-Mar. 6, 2020. (Year: 2020).*
(Continued)

*Primary Examiner* — Mohammed S Chowdhury

(57) ABSTRACT

Methods and apparatuses for multiplexing unicast and multicast control information. A method for providing hybrid automatic repeat request acknowledgement (HARQ-ACK) information includes receiving a downlink control information (DCI) format scheduling transmission of a physical uplink shared channel (PUSCH). The DCI format includes one or more first downlink assignment indicator (DAI) bits associated with first HARQ-ACK information and one or more second DAI bits associated with second HARQ-ACK information. The method further includes determining the first HARQ-ACK information based on a value of the one or more first DAI bits and the second HARQ-ACK information based on a value of the one or more second DAI bits. The first HARQ-ACK information is associated with a first set of radio network temporary identifiers (RNTIs), and the second HARQ-ACK information is associated with a second set of RNTIs. The method further includes transmitting the PUSCH, which includes the first and second HARQ-ACK information.

9 Claims, 12 Drawing Sheets

Related U.S. Application Data on Feb. 23, 2021, provisional application No. 63/149,959, filed on Feb. 16, 2021.

(58) Field of Classification Search
CPC ... H04L 5/0023; H04L 5/0032; H04L 5/0044; H04L 5/0091; H04L 1/0061; H04L 1/0072; H04L 1/1671; H04L 1/1864; H04L 1/1861; H04L 5/0094
See application file for complete search history.

(56) References Cited

U.S. PATENT DOCUMENTS

| | | | |
|---|---|---|---|
| 2020/0127772 A1 | 4/2020 | Papasakellariou | |
| 2022/0216955 A1* | 7/2022 | Kim | H04L 1/1861 |
| 2022/0256586 A1* | 8/2022 | Zeng | H04L 5/0055 |
| 2023/0199799 A1* | 6/2023 | Wu | H04L 1/1822 370/329 |
| 2023/0354370 A1* | 11/2023 | Yang | H04W 72/1273 |
| 2024/0057108 A1* | 2/2024 | Yi | H04L 1/1854 |
| 2024/0073894 A1* | 2/2024 | Lei | H04L 1/1812 |

OTHER PUBLICATIONS

International Search Report and Written Opinion issued May 24, 2022 regarding Application No. PCT/KR2022/002128, 8 pages.
"5G; NR;Physical layer procedures for control (3GPP TS 38.213 version 15.5.0 Release 15)", ETSI TS 138 213 V15.5.0, May 2019, 106 pages.
"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP Ts 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
Extended European Search Report issued April, 5, 2024 regarding Application No. 22756438.2, 9 pages.
Moderator (Huawei), "FL summary#3 on improving reliability for MBS for RRC_CONNECTED UEs", 3GPP TSG RAN WG1 Meeting #104-e, R1-2101987, Jan. 2021, 69 pages.
Ad-hoc Chair (Ericsson), "Session notes for 8.12 (NR Multicast and Broadcast Services)", 3GPP TSG-RAN WG1 Meeting #104-e Tdoc, R1-2102197, Jan. 2021, 7 pages.

* cited by examiner

MULTIPLEXING UNICAST AND MULTICAST CONTROL INFORMATION

CROSS-REFERENCE TO RELATED APPLICATION AND CLAIM OF PRIORITY

This application claims priority under 35 U.S.C. § 119(e) to U.S. Provisional Patent Application No. 63/149,959 filed on Feb. 16, 2021, U.S. Provisional Patent Application No. 63/152,696 filed on Feb. 23, 2021, and U.S. Provisional Patent Application No. 63/296,722 filed on Jan. 5, 2022. The above-identified provisional patent applications are hereby incorporated by reference in their entirety.

TECHNICAL FIELD

The present disclosure relates generally to wireless communication systems and, more specifically, the present disclosure relates to link adaptation for groupcast communication and/or multiplexing different acknowledgment information types in a data channel.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to link adaptation for groupcast communication and/or multiplexing different acknowledgment information types in a data channel.

In one embodiment, a method for providing hybrid automatic repeat request acknowledgement (HARQ-ACK) information is provided. The method includes receiving a downlink control information (DCI) format scheduling transmission of a physical uplink shared channel (PUSCH). The DCI format includes one or more first downlink assignment indicator (DAI) bits associated with first HARQ-ACK information and one or more second DAI bits associated with second HARQ-ACK information. The method further includes determining the first HARQ-ACK information based on a value of the one or more first DAI bits and the second HARQ-ACK information based on a value of the one or more second DAI bits. The first HARQ-ACK information is associated with a first set of radio network temporary identifiers (RNTIs), and the second HARQ-ACK information is associated with a second set of RNTIs. The method further includes transmitting the PUSCH, which includes the first HARQ-ACK information and the second HARQ-ACK information.

In another embodiment, a user equipment (UE) is provided. The UE includes a transceiver configured to receive a DCI format scheduling transmission of a PUSCH. The DCI format includes one or more first DAI bits associated with first HARQ-ACK information and one or more second DAI bits associated with second HARQ-ACK information. The UE further includes a processor operably coupled to the transceiver. The processor is configured to determine the first HARQ-ACK information based on a value of the one or more first DAI bits and the second HARQ-ACK information based on a value of the one or more second DAI bits. The first HARQ-ACK information is associated with a first set of RNTIs, and the second HARQ-ACK information is associated with a second set of RNTIs. The transceiver is further configured to transmit the PUSCH, which includes the first HARQ-ACK information and the second HARQ-ACK information.

In yet another embodiment, a base station is provided. The base station includes a transceiver configured to transmit a DCI format scheduling reception of a PUSCH and receive the PUSCH. The DCI format includes one or more first DAI bits associated with first HARQ-ACK information and one or more second DAI bits associated with second HARQ-ACK information. The PUSCH includes the first HARQ-ACK information and the second HARQ-ACK information. The base station further includes a processor operably coupled to the transceiver. The processor configured to determine the first HARQ-ACK information based on a value of the one or more first DAI bits and the second HARQ-ACK information based on a value of the one or more second DAI bits. The first HARQ-ACK information is associated with a first set of RNTIs, and the second HARQ-ACK information is associated with a second set of RNTIs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
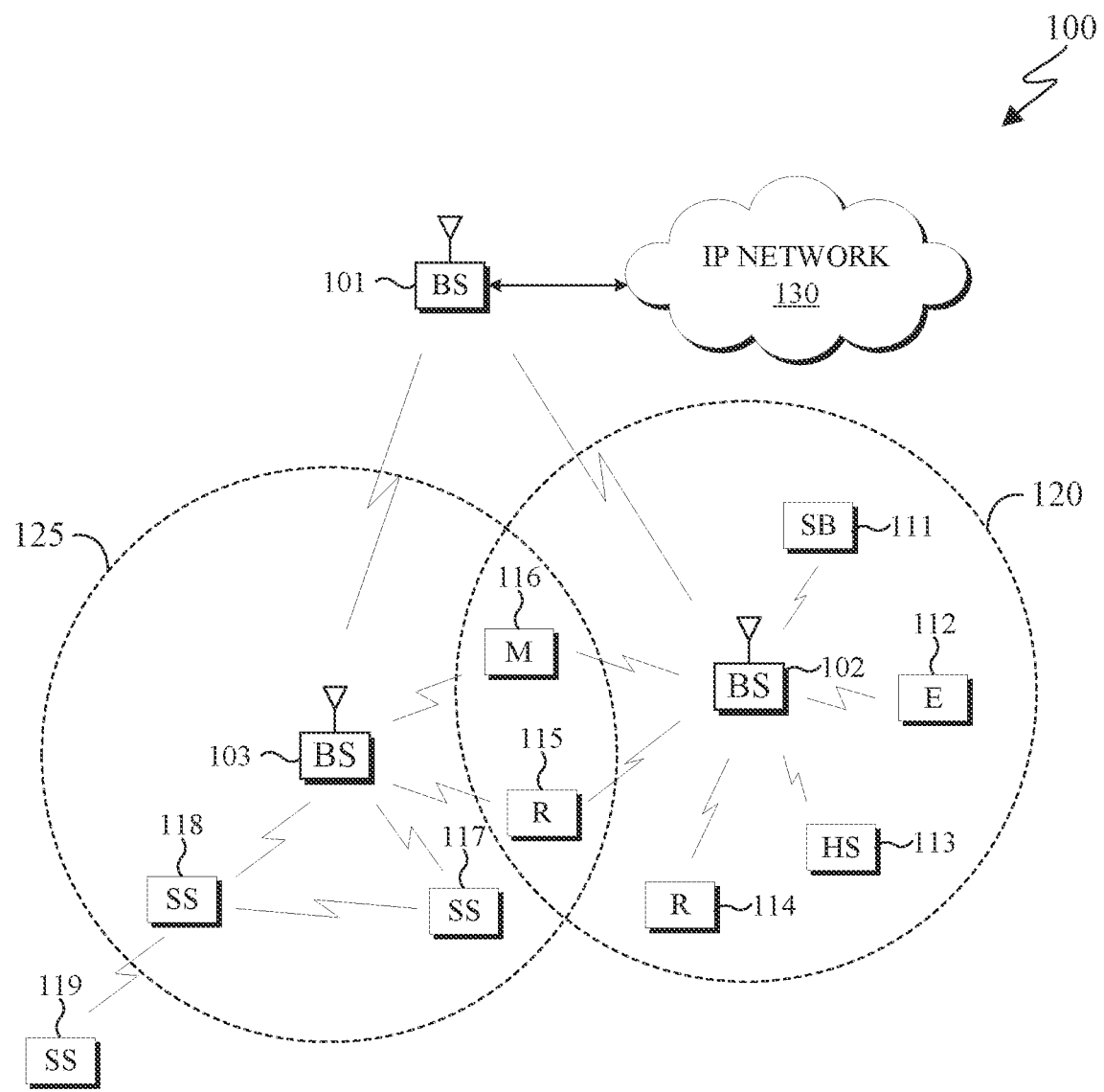
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: [1] 3GPP TS 38.211 v16.4.0, "NR; Physical channels and modulation;" [2] 3GPP TS 38.212 v16.4.0, "NR; Multiplexing and Channel coding;" [3] 3GPP TS 38.213 v16.4.0, "NR; Physical Layer Procedures for Control;" [4] 3GPP TS 38.214 v16.4.0, "NR; Physical Layer Procedures for Data;" [5] 3GPP TS 38.321 v16.3.0, "NR; Medium Access Control (MAC) protocol specification;" [6] 3GPP TS 38.331 v16.3.1, "NR; Radio Resource Control (RRC) Protocol Specification."

To meet the demand for wireless data traffic having increased since deployment of the fourth generation (4G) communication systems and the enable various vertical applications, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals.

Also, depending on the network type, the term 'user equipment' (UE) can refer to any component such as mobile station, subscriber station, remote terminal, wireless terminal, receive point, vehicle, or user device. For example, a UE could be a mobile device, a stationary device. For instance a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
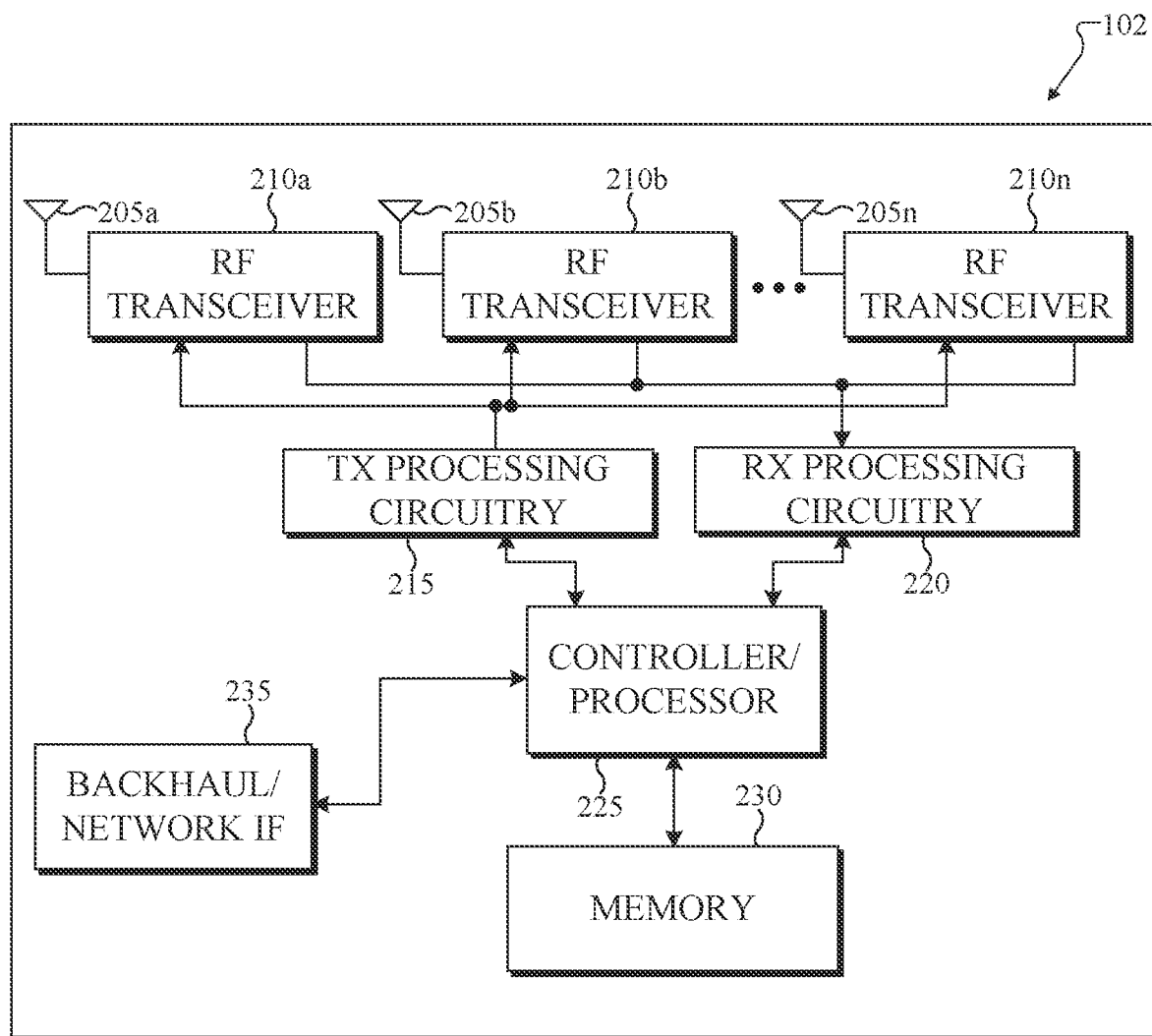
FIG. 2 illustrates an example base station (BS) according to embodiments of the present disclosure.
Figure 3:
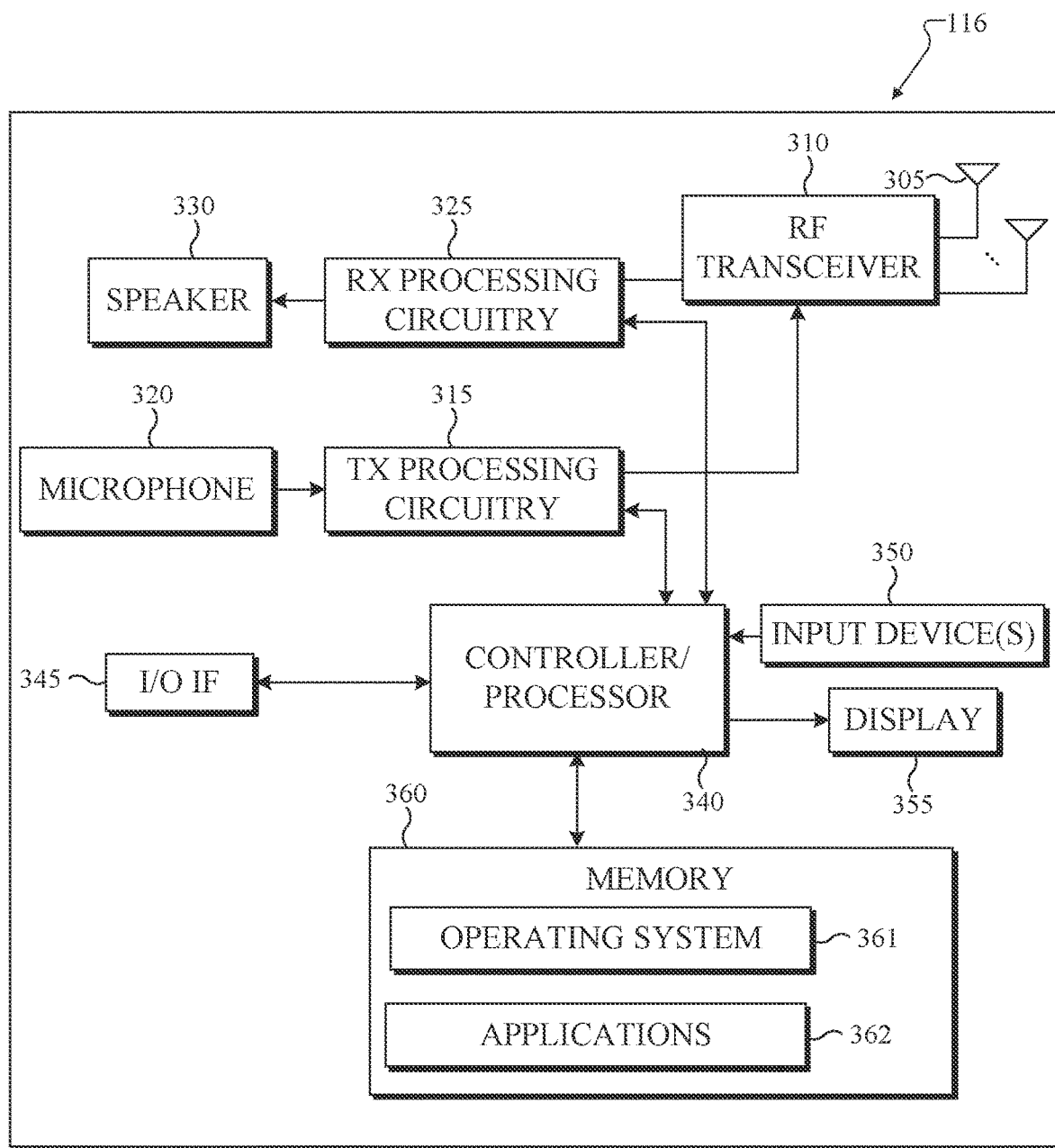
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

Depending on the network type, other well-known terms may be used instead of "gNodeB" or "gNB," such as "base station" or "access point." For the sake of convenience, the terms "BS," "gNodeB," and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programing, or a combination thereof for link adaptation for groupcast communication and/or multiplexing different acknowledgment information types in a data channel. In certain embodiments, and one or more of the BSs 101-103 includes circuitry, programing, or a combination thereof for link adaptation for groupcast communication and/or multiplexing different acknowledgment information types in a data channel.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support a blind interference sensing (BIS) process, such as performed by a BIS algorithm, and decodes the received signal subtracted by the interfering signals. The controller/processor 225 could also support link adaptation for groupcast communication and/or multiplexing different acknowledgment information types in a data channel. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities (such as web real time communications (RTC)) as well as support link adaptation for groupcast communication as described in embodiments of the present disclosure. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
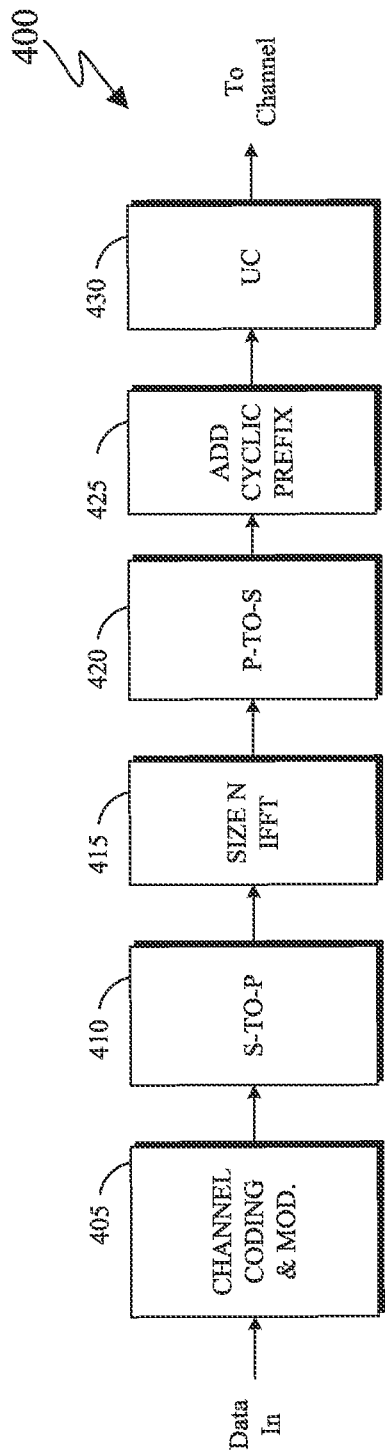
FIGS. 4 and 5 illustrate example wireless transmit and receive paths according to embodiments of present disclosure.
Figure 5:
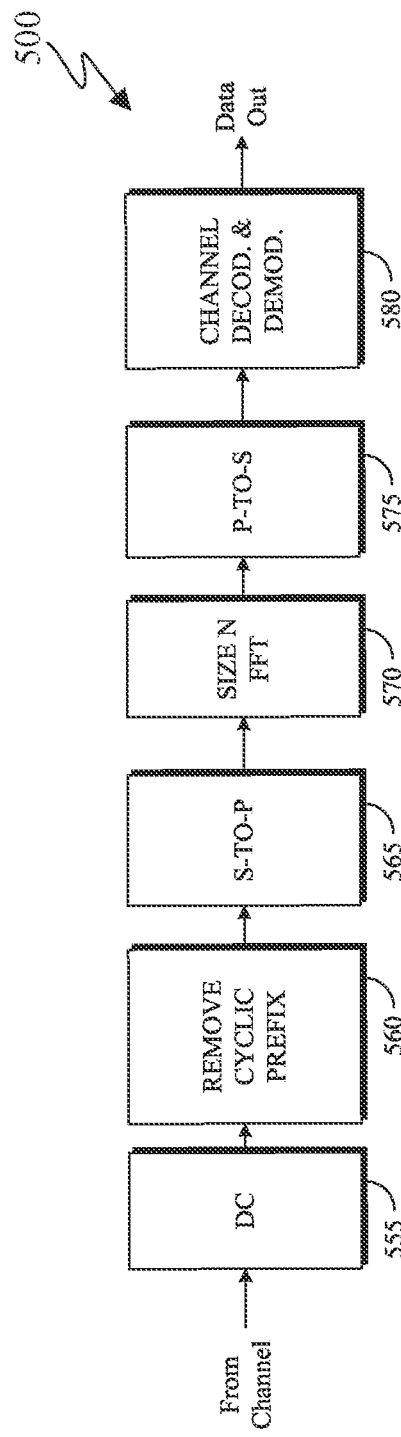

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support link adaptation for groupcast communication and/or multiplexing different acknowledgment information types in a data channel as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

As described in more detail below, the transmit and receive paths of a BS, such as the BS 102 (implemented using the RF transceivers 210a-210n, TX processing circuitry 215, and/or RX processing circuitry 220) support communication with aggregation of frequency division duplexing (FDD) cells and time division duplexing (TDD) cells.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration y as 2-15 kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective PDSCHs or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format.

A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

In certain embodiments, a gNB (such as the BS 102) transmits synchronization signals and physical broadcast channel (SS/PBCH) blocks for a UE (such as the UE 116) to perform initial access to a cell and to also perform measurements. A gNB transmits one or more of multiple types of RS including channel state information RS (CSI-RS) and demodulation RS (DMRS).

A CSI-RS is intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF 3). The CSI-IM resources can also be associated with a zero power CSI-RS (ZP CSI-RS) configuration. A UE can determine CSI-RS reception parameters through DL control signaling or higher layer signaling, such as RRC signaling from a gNB (see also REF 5). A DMRS is typically transmitted only within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect decoding of transport blocks (TBs) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE can transmit a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. In certain embodiments, groupcast PDSCH receptions can occur in a common frequency region for a group of UEs, wherein the common frequency region is within an active DL BWP for each UE from the group of UEs. DL transmissions from a BS (such as the BS 102) and UL transmissions from a UE (such as the UE 116) can be based on an orthogonal frequency division multiplexing (OFDM) waveform including a variant using DFT precoding that is known as DFT-spread-OFDM.

Figure 6:
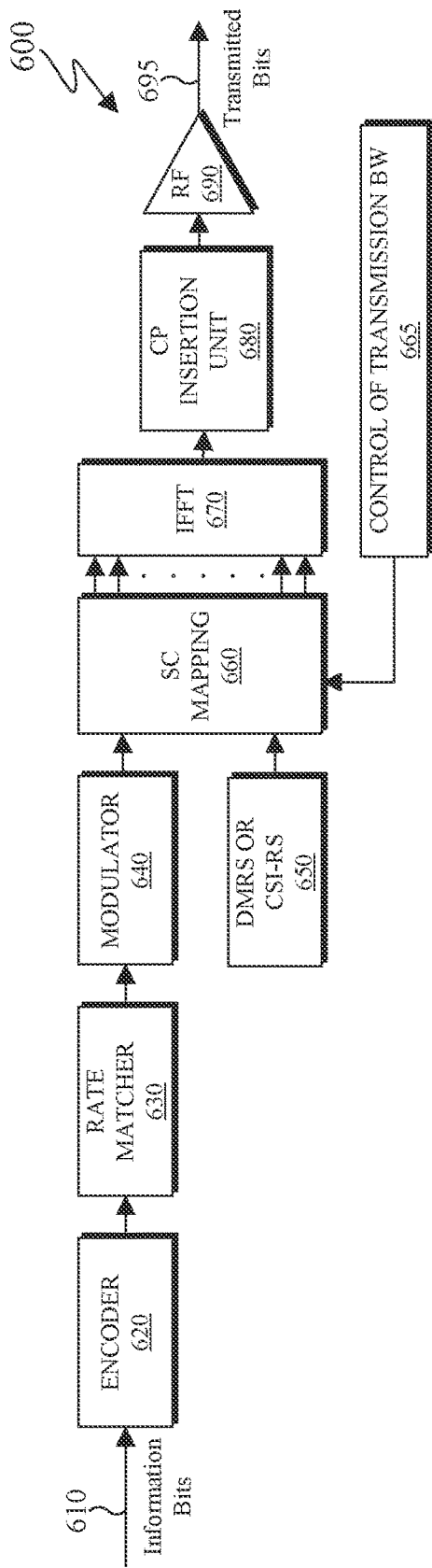
FIG. 6 illustrates a block diagram of an example transmitter structure using orthogonal frequency division multiplexing (OFDM) according to embodiments of the present disclosure.
Figure 7:
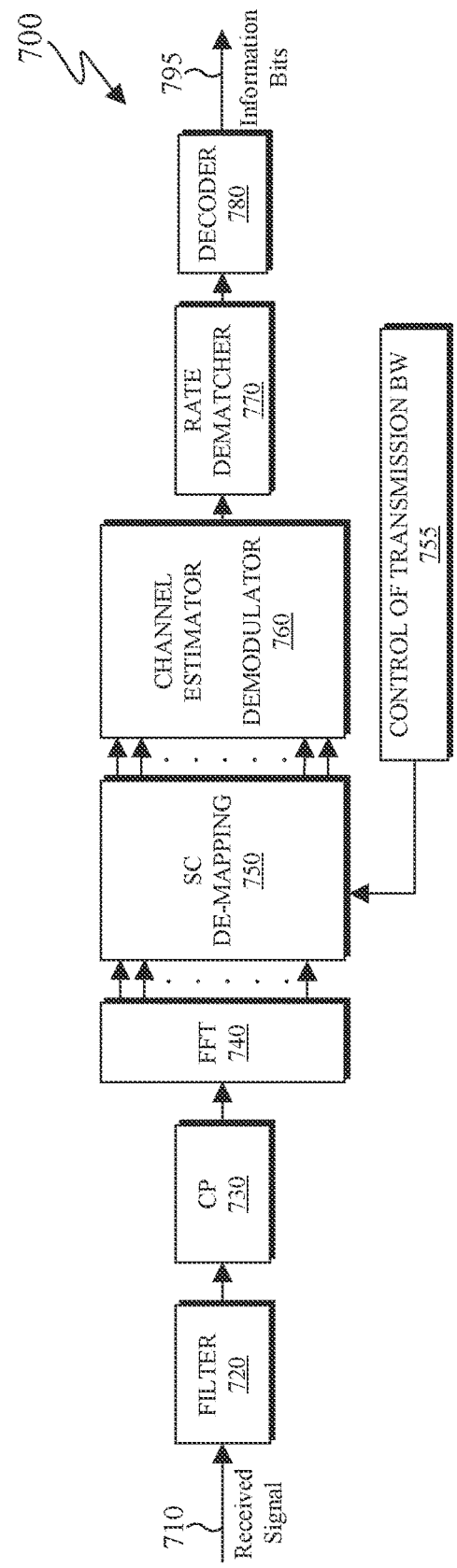
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) monitors multiple candidate locations for respective potential PDCCH receptions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) a modulation and coding scheme (MCS)-C-RNTI and serves as a UE identifier. In the following, for brevity, only the C-RNTI will be referred to when needed. A UE can receive/monitor PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 22 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type3-PDCCH CSS.

Similar to DCI formats providing information to a UE for parameters associated with receptions or transmissions by the UE, a UE (such as the UE 116) can be configured to monitor PDCCH for detection of a DCI format scheduling a broadcast or a groupcast PDSCH transmission. Such a DCI format may also not include a PUCCH resource indication for each UE from the group of UEs, or may not include a counter downlink assignment index (DAI) or a total DAI for determination of a Type-2 HARQ-ACK codebook, and so on, and there may not be another DCI format for the UE to detect before the UE needs to provide an acknowledgement information report regarding a detection of the DCI format.

When a UE does not detect a DCI format providing information for parameters associated with receptions or transmissions by the UE, it is generally beneficial for the UE to inform a serving gNB so that the UE and the gNB have a same understanding. Such information can be considered as acknowledgement information for the detection or absence of detection of the DCI format.

In certain embodiments, a UE may need to report HARQ-ACK information in response to correct or incorrect detection of a DCI format together with HARQ-ACK information in response to correct of incorrect detection of TBs. For example, the HARQ-ACK information for a detection of a DCI format can be for a DCI format indicating an SPS PDSCH release or for a DCI format indicating a dormant/non-dormant BWP for a cell from a group of cells, and so on. For brevity, only HARQ-ACK information in response to correct or incorrect reception of TBs is subsequently considered but it should be understood that HARQ-ACK information can also be in response to additional reception outcomes.

The HARQ-ACK information report can be based on one of several codebook types such as a Type-1 HARQ-ACK codebook or a Type-2 HARQ-ACK codebook.

A PUCCH resource determination and a determination of an HARQ-ACK codebook can be different for the two HARQ-ACK information types. This is because a DCI format providing information for a group of UEs or scheduling a PDSCH reception by a group of UEs may not include a field indicating a PUCCH resource for each UE from the group of UEs, or may not include a DAI, and so on. Also, when a UE does not detect a DCI format, there may not be another DCI format for the UE to detect before the UE needs to provide HARQ-ACK information regarding a detection of the DCI format.

In certain embodiments, a UE can determine a PUCCH transmission power $P_{PUCCH,b,f,c}$ on an active UL BWP b of carrier f in a cell c using PUCCH power control adjustment state with index l as in Equation (1).

$$P_{PUCCH,b,f,c} = \min\begin{Bmatrix} P_{CMAX,f,c} \\ P_{O\_PUCCH,b,f,c} + 10\log_{10}(2^\mu \cdot M_{RB,b,f,c}^{PUCCH}) + \\ PL_{b,f,c} + \Delta_{F\_PUCCH} + \Delta_{TF,b,f,c} + g_{b,f,c} \end{Bmatrix} [dBm] \quad (1)$$

Here, the corresponding parameters are described in detail in REF 3. For example, $P_{CMAX,f,c}$ is a maximum transmission power, $P_{O\_PUCCH,b,f,c}$ is a nominal received power, $\mu$ is a sub-carrier spacing (SCS) configuration with $\mu=0$ corresponding to 15 kHz, $M_{RB,b,f,c}^{PUCCH}$ is a number of RBs for the PUCCH transmission, $PL_{b,f,c}$ is a measured path-loss, $\Delta_{F\_PUCCH}$ depends on several parameters for the PUCCH transmission including a PUCCH format, $\Delta_{TF,b,f,c}$ provides an adjustment according to a spectral efficiency, and $g_{b,f,c}$ is a closed-loop power control state based on transmit power control (TPC) command values the UE receives in DCI formats.

A UE can also multiplex HARQ-ACK information in a PUSCH transmission. Then, a UE determines a number of coded modulation symbols for the HARQ-ACK information based on a number of HARQ-ACK information bits, a spectral efficiency of the PUSCH transmission, and a scaling factor $\beta_{offset}^{HARQ-ACK}$. Further, the UE can reserve a number of REs in the PUSCH transmission for multiplexing a number of HARQ-ACK information bits, such as two bits, in order to avoid error events where a serving gNB expects HARQ-ACK information to be multiplexed in the PUSCH transmission but the UE fails to detect a DCI format associated with the HARQ-ACK information.

When a PDSCH reception is by a single UE it can then referred to as unicast PDSCH reception. When a PDSCH reception is by a group of UEs it can then referred to as groupcast or multicast PDSCH reception. In this disclosure, the terms 'groupcast' and 'multicast' are used interchangeably. A UE can be configured to receive both unicast PDSCH and groupcast PDSCH. The UE can identify whether a PDSCH reception is a unicast one or a groupcast on based on the DCI format scheduling the PDSCH reception or based on a configuration by higher layers when the PDSCH reception is not scheduled by a DCI format. For example, a DCI format with CRC scrambled by a first RNTI, such as a cell-RNTI (C-RNTI), or having a field indicating a first PDSCH type, such as unicast PDSCH, can be used to schedule a unicast PDSCH reception while a DCI format with CRC scrambled by a second RNTI, such as a group-RNTI (G-RNTI), or having a field indicating a second PDSCH type, such as groupcast PDSCH (or multicast PDSCH or broadcast PDSCH), can be used to schedule a groupcast PDSCH reception.

When a PDSCH reception by a UE (such as the UE 116) is scheduled by a DCI format provided by a PDCCH reception, a value of a field in the DCI format indicates a value from a set of values for an associated parameter wherein the set of values is provided by higher layers or is predetermined in the specifications of the system operation. For example, a modulation and coding scheme (MCS) for the UE to use in demodulating and decoding a TB in the PDSCH is indicated by a value of a MCS field in the DCI format. Here, the value serves as an index to an MCS table, from a number of MCS tables defined in the specifications of the system operation, The MCS table can be indicated to the UE by higher layer, such as by RRC signaling. An information element that provides to the UE individual configurations for fields associated with a PDSCH reception is referred to as PDSCH-Config. For example, PDSCH-Config includes a configuration of an MCS table for PDSCH receptions through a field mcs-Table, a configuration of a time domain resource allocation (TDRA) table with rows corresponding symbols of a slot for PDSCH receptions through a field pdsch-TimeDomainAllocationList, a number of repetitions for the PDSCH reception through a field pdsch-AggregationFactor, a frequency domain resource allocation (FDRA) type through resourceAllocation indicating whether the resource allocation in the frequency domain is always contiguous, or can be non-contiguous with a granularity of resource block groups (RBGs), or can vary between contiguous and non-contiguous based on a corresponding indication in the DCI format, a set of transmission configuration indication (TCI) states by tci-StatesToAddModList, and so on. Unicast PDSCH receptions and groupcast PDSCH receptions can have different characteristics, such as different transmission points requiring different values for tci-StatesToAddModList or different maximum or minimum MCS requiring different values of mcs-Table, and so on. Those different characteristics can be addressed by providing separate PDSCH-Config for groupcast PDSCH receptions and unicast PDSCH receptions. Groupcast PDSCH receptions can also be from different transmission points or have different priorities, corresponding for example to different BLER targets or different latency requirements for providing corresponding HARQ-ACK information reports, and separate PDSCH-Config can also be provided for different groupcast PDSCH transmissions. Similar to PDSCH receptions, a UE can be provided separate information elements PDCCH-Config for PDCCH receptions for unicast PDCCH receptions and for groupcast PDCCH receptions or for different groupcast PDCCH receptions.

As a groupcast PDSCH is intended to be received by a group of UEs, a different link adaptation should be enabled for a first TB provided by a groupcast PDSCH than for a second TB provided by a unicast PDSCH. This is motivated by (i) the case that different BLERs are targeted for the first and second TBs and (ii) the case that similar BLERs are targeted as a UE in the group of UEs can have a smaller signal-to-interference and noise ratio (SINR) than another UE in the group of UEs and therefore, for a same TB size and a same target BLER, a smaller MCS needs to be used for a TB in the groupcast PDSCH than, in general, for a UE in the unicast PDSCH. Moreover, a frequency region for groupcast PDSCH receptions by a UE can be different than a frequency region for unicast PDSCH receptions by the UE and therefore a wideband CQI report needs to be different. Moreover, a UE configured for groupcast PDSCH receptions may not have unicast PDSCH receptions, for example because there is no unicast traffic for the UE or because the buffer for unicast traffic for the UE is empty at a given time. Therefore, there is a need to enable a UE to provide CSI reports associated with groupcast PDSCH separately from CSI reports associated with unicast PDSCH.

It can be beneficial to provide mechanisms that enable triggering of CSI reports for groupcast PDSCH receptions by a subset of UEs configured to receive the groupcast PDSCH. One reason is because that a number of UEs configured to receive groupcast PDSCH for a corresponding service can be large and an overhead associated with CSI reports from all those UEs can also be large, particularly for networks operating in TDD (unpaired spectrum) mode where additional overhead for UL transmissions is equivalent to a decrease in resources for DL transmissions. Another reason is because, in general, not all UEs in the group of UEs need to provide CSI reports as UEs experiencing favorable channel conditions, such as larger average SINRs due to smaller propagation loss, are more likely to receive a TB with a target BLER than UEs experiencing unfavorable channel conditions. Based on long term reports provided by the UEs, such as for a reference signal received power (RSRP), the network can determine UEs that are more likely to incorrectly decode a TB in a groupcast PDSCH, and request a CSI report only from such UEs in order to subsequently perform link adaptation, such as MCS or power adaptation, for a TB in a groupcast PDSCH transmission.

A configuration for a CSI report for groupcast PDSCH receptions can be different than a configuration of a CSI report for unicast PDSCH receptions. For example, groupcast PDSCH receptions can be with a different rank than unicast PDSCH receptions and, for example, rank 1 can be used for groupcast PDSCH receptions while rank 2 can be used for unicast PDSCH receptions. A UE may be therefore triggered to provide multiple CSI reports in PUCCH transmissions or in PUSCH transmissions in a same slot, such as one or more CSI reports for groupcast PDSCH receptions and one or more CSI reports for unicast PDSCH receptions wherein the CSI reports may also have different target BLERs (target reception reliability). Also, depending on a resource availability in a PUCCH transmission or in a PUSCH transmission providing multiple CSI reports, the UE may need to drop multiplexing of some CSI reports.

Therefore, embodiments of the present disclosure take into consideration that there is a need to enable and trigger CSI reports from a sub-group of UEs in a group of UEs configured for groupcast PDSCH receptions. Embodiments of the present disclosure also take into consideration that there is a need to enable and indicate groupcast PDSCH receptions using different configurations for corresponding sets of parameters. Embodiments of the present disclosure further take into consideration that there is a need to define rules for multiplexing CSI reports for one or more types of groupcast PDSCH receptions and for one or more types of unicast PDSCH receptions.

Accordingly embodiments of this disclosure, such as those described in FIGS. 8-11 relates to enabling and triggering CSI reports from a sub-group of UEs in a group of UEs configured for groupcast PDSCH receptions. The disclosure also relates to enabling and indicating groupcast PDSCH receptions using different configurations for corresponding sets of parameters. The disclosure further relates to defining rules for multiplexing CSI reports for one or more types of groupcast PDSCH receptions and for one or more types of unicast PDSCH receptions.

In certain embodiments, when a UE receives both unicast PDSCH and groupcast PDSCH, the UE should determine how to provide corresponding HARQ-ACK information. A first option is for the UE to determine separate HARQ-ACK codebooks for unicast PDSCH receptions and for groupcast PDSCH receptions. The UE can then multiplex each of the HARQ-ACK codebooks in a separate corresponding PUCCH transmission or the UE can jointly or separately encode and multiplex the HARQ-ACK codebooks in a same PUCCH transmission.

A second option is for the UE to determine a single HARQ-ACK codebook for unicast PDSCH receptions and for groupcast PDSCH receptions. The second option is not generally possible for a Type-2 HARQ-ACK codebook as, unlike a value of a first DAI field in a DCI format scheduling a unicast PDSCH reception, a value of a second DAI field in a DCI format scheduling a groupcast PDSCH reception cannot be specific to a UE and therefore the UE cannot determine a Type-2 HARQ-ACK codebook by jointly processing the values of the first and second DAI fields. For a Type-1 HARQ-ACK codebook, determining a single HARQ-ACK codebook for unicast PDSCH receptions and for groupcast PDSCH receptions is possible. A Type-1 HARQ-ACK codebook is more robust to missed detections of DCI format than a Type-2 HARQ-ACK codebook but it also results to a larger codebook size. If a Type-1 HARQ-ACK codebook for unicast PDSCH receptions and a Type-1 HARQ-ACK codebook for groupcast PDSCH receptions are to be multiplexed in a same PUCCH or PUSCH, the corresponding overhead can be large and that can also reduce coverage for a given target reception reliability.

A UE (such as the UE 116) can support a predetermined number of HARQ processes, such as 16 HARQ processes. The number of supported HARQ processes can be a requirement or a capability that the UE reports to a serving gNB (such as the BS 102). When a UE (such as the UE 116) is configured to receive both unicast PDSCH and groupcast PDSCH, a HARQ process for a corresponding TB can be associated either with a unicast PDSCH or with a groupcast PDSCH for a corresponding Type-2 HARQ-ACK codebook. When an initial reception of a TB is provided by a groupcast PDSCH reception by a UE, a subsequent reception of the TB can be provided either by a groupcast PDSCH reception or by a unicast PDSCH reception by the UE, for example when the UE reports a NACK value for the initial reception of the TB, and the UE can multiplex HARQ-ACK information for the subsequent reception of the TB in a HARQ-ACK codebook for groupcast PDSCH receptions or in a HARQ-ACK codebook for unicast PDSCH receptions, respectively.

HARQ-ACK information in response to TB receptions from unicast PDSCH receptions can be associated with multiple priorities. Similar, HARQ-ACK information in response to TB receptions from groupcast PDSCH receptions can also be associated with multiple priorities. When a UE (such as the UE 116) would transmit a first PUCCH with HARQ-ACK information report associated with a detection of a DCI format with CRC scrambled by a C-RNTI (unicast HARQ-ACK information) and a second PUCCH with HARQ-ACK information report associated with a detection of a DCI format with CRC scrambled by a G-RNTI (groupcast HARQ-ACK information), the UE needs to determine whether to multiplex the two HARQ-ACK information reports in a same PUCCH. If the UE determines to multiplex the two HARQ-ACK information reports in a same PUCCH, the UE needs to also determine a corresponding PUCCH resource; otherwise, the UE needs to determine whether to transmit the first PUCCH or the second PUCCH (and to drop transmission of the second PUCCH or the first PUCCH, respectively).

A serving gNB (such as the BS 102) can provide by higher layer signaling to a UE a number of PUCCH resource sets for the UE to determine a PUCCH resource set and a PUCCH resource from the PUCCH resource set for transmission of HARQ-ACK information in response to a correct or incorrect detection of a TB in a groupcast PDSCH reception. The UE determines a PUCCH resource set based on a payload of a corresponding HARQ-ACK information. To enable flexible allocation of PUCCH resources, a PUCCH resource indicator field, with fixed or configurable size, can be included in a DCI format scheduling a groupcast PDSCH reception and a UE can then determine a PUCCH resource based on a value of the field. The UE can also be provided PUCCH resource sets for multiplexing HARQ-ACK information in response to unicast PDSCH receptions in a PUCCH transmission. The UE determines a PUCCH resource based on a value of a PUCCH resource indicator field in a last DCI format that the UE correctly receives and generates corresponding HARQ-ACK information that is included in a PUCCH transmission using the PUCCH resource. The last DCI format is provided by a PDCCH reception that starts last, that is after all other PDCCH receptions providing DCI formats with corresponding HARQ-ACK information multiplexed in a same PUCCH as described in REF 3. In case of multiple last PDCCH receptions that provide DCI formats scheduling PDSCH receptions on respective multiple cells, the last PDCCH reception is the one corresponding to a cell from the multiple cells with a largest cell index. When the UE multiplexes unicast and groupcast HARQ-ACK information in a same HARQ-ACK codebook, it is not generally possible for the UE to determine a PUCCH resource based on a value of a PUCCH resource indicator field in a DCI format scheduling a groupcast PDSCH reception as a value of the PUCCH resource indicator field needs to indicate a PUCCH resource to multiple UEs and cannot account for the unicast HARQ-ACK information.

When a UE multiplexes HARQ-ACK information in a PUSCH transmission, a DCI format scheduling the PUSCH transmission includes a DAI field providing information to the UE for multiplexing the HARQ-ACK information in the PUSCH. When the UE provides a Type-1 HARQ-ACK codebook, the DAI field comprises of 1 bit with a value indicating whether or not the UE should multiplex a Type-1 HARQ-ACK codebook in the PUSCH. When the UE provides a Type-2 HARQ-ACK codebook, the DAI field indicates a total number of DCI formats (modulo the maximum value of the DAI field) that the UE needs to provide corresponding information in the Type-2 HARQ-ACK codebook to be multiplexed in the PUSCH. When the UE multiplexes HARQ-ACK information for both unicast and groupcast PDSCH receptions, the UL DAI field needs to account for both the unicast and groupcast HARQ-ACK information.

A UE determines a number of resource elements (REs) in a PUSCH for multiplexing HARQ-ACK information based on a number of HARQ-ACK information bits, a value of a $\beta_{PUSCH}^{HARQ-ACK}$ parameter scaling a number of REs that are determined based on the MCS of a TB in the PUSCH and a value of a scaling parameter a that indicates a fraction (upper limit) of PUSCH REs that are not used for RS transmission and can be available for multiplexing HARQ-ACK information (or, in general, UCI) in the PUSCH. When a DCI format scheduling a PUSCH transmission does not include a beta_offset field indicating a $\beta_{PUSCH}^{HARQ-ACK}$ value, the $\beta_{PUSCH}^{HARQ-ACK}$ value is provided by a higher layer parameter betaOffsets. Otherwise, the betaOffsets provides multiple values, such as 2 or 4 values, and the beta_offset field in the DCI format indicates one $\beta_{PUSCH}^{HARQ-ACK}$ value. A value of a is provided by higher layer parameter scaling. HARQ-ACK information for TB receptions in unicast PDSCH can require different reliability than HARQ-ACK information for TB receptions in groupcast PDSCH, thereby requiring a separate indication of a $\beta_{PUSCH}^{HARQ-ACK}$ or of a α value. Therefore, a UE can be provided a first higher layer information element UCI-OnPUSCH, that includes the betaOffsets and scaling fields, for unicast HARQ-ACK information and a second UCI-OnPUSCH for groupcast HARQ-ACK information. A procedure needs to be defined for a UE to determine applicable values for the betaOffsets and scaling fields when the UE multiplexes both unicast HARQ-ACK information and groupcast HARQ-ACK information in a PUSCH. Further, a number of reserved REs in a PUSCH for multiplexing HARQ-ACK information needs to be defined when the UE multiplexes both unicast and groupcast HARQ-ACK information in the PUSCH.

A gNB (such as the BS 102) can disable a HARQ-ACK information report from a UE based on an indication in a DCI format scheduling a corresponding PDSCH reception. For example, a first UE can be configured by higher layers to not provide HARQ-ACK information for a corresponding PDSCH reception and a second UE may not be provided such configuration (default operation then is for the second UE to provide (or to not provide) HARQ-ACK information for a corresponding PDSCH reception) or the second UE may be configured by higher layers to provide HARQ-ACK information for a corresponding PDSCH reception. A DCI format scheduling a PDSCH reception can include a binary field indicating whether or not a corresponding HARQ-ACK information report is enabled or disabled and the second UE can determine whether or not to provide HARQ-ACK information for the PDSCH reception based on the indication. The indication to enable or disable a HARQ-ACK information report by a DCI format scheduling a corresponding PDSCH reception can depend on a HARQ-ACK codebook type that is configured to the UE as such indication by the DCI format is not always applicable.

A UE can be configured to receive PDSCHs using frequency duplex multiplexing (FDM) in a BWP, or in a common frequency region within an active DL BWP for groupcast PDSCH, of a serving cell. Such configuration can be based on an indication by the UE of a corresponding capability. The PDSCH receptions can correspond to different services such as a first unicast and a first groupcast service, or a first groupcast service and a second groupcast service. For a single TRP, Type-1 and Type-2 HARQ-ACK codebooks are currently restricted to supporting a single PDSCH reception per serving cell at a given time and do not support FDM PDSCH receptions on a serving cell.

Therefore, embodiments of the present disclosure take into consideration that there is a need to determine a procedure for multiplexing first HARQ-ACK information associated with first DCI formats and second HARQ-ACK information associated with second DCI formats in a PUSCH transmission. Embodiments of the present disclosure also take into consideration that there is a need to determine a number of reserved resource elements in a PUSCH for multiplexing first HARQ-ACK information associated with first DCI formats and second HARQ-ACK information associated with second DCI formats. Embodiments of the present disclosure further take into consideration that there is a need to determine a number of resource elements in a PUSCH for multiplexing first HARQ-ACK information associated with first DCI formats and second HARQ-ACK information associated with second DCI formats.

Figure 12:
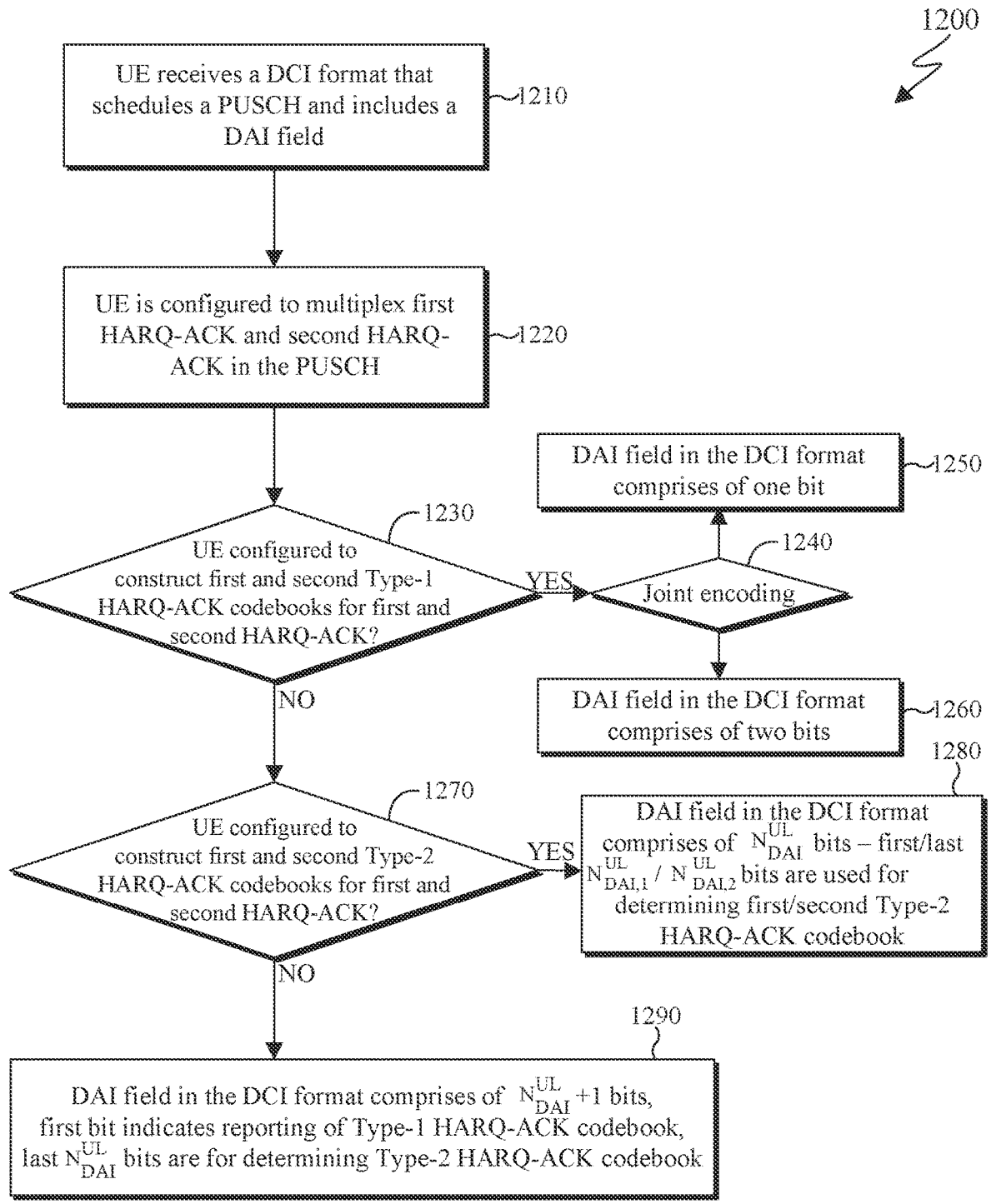
FIG. 12 illustrates an example method for determining a number of DAI bits in a DCI format scheduling a PUSCH transmission corresponding to first and second HARQ-ACK information multiplexed in the PUSCH according to embodiments of the present disclosure.
Figure 13:
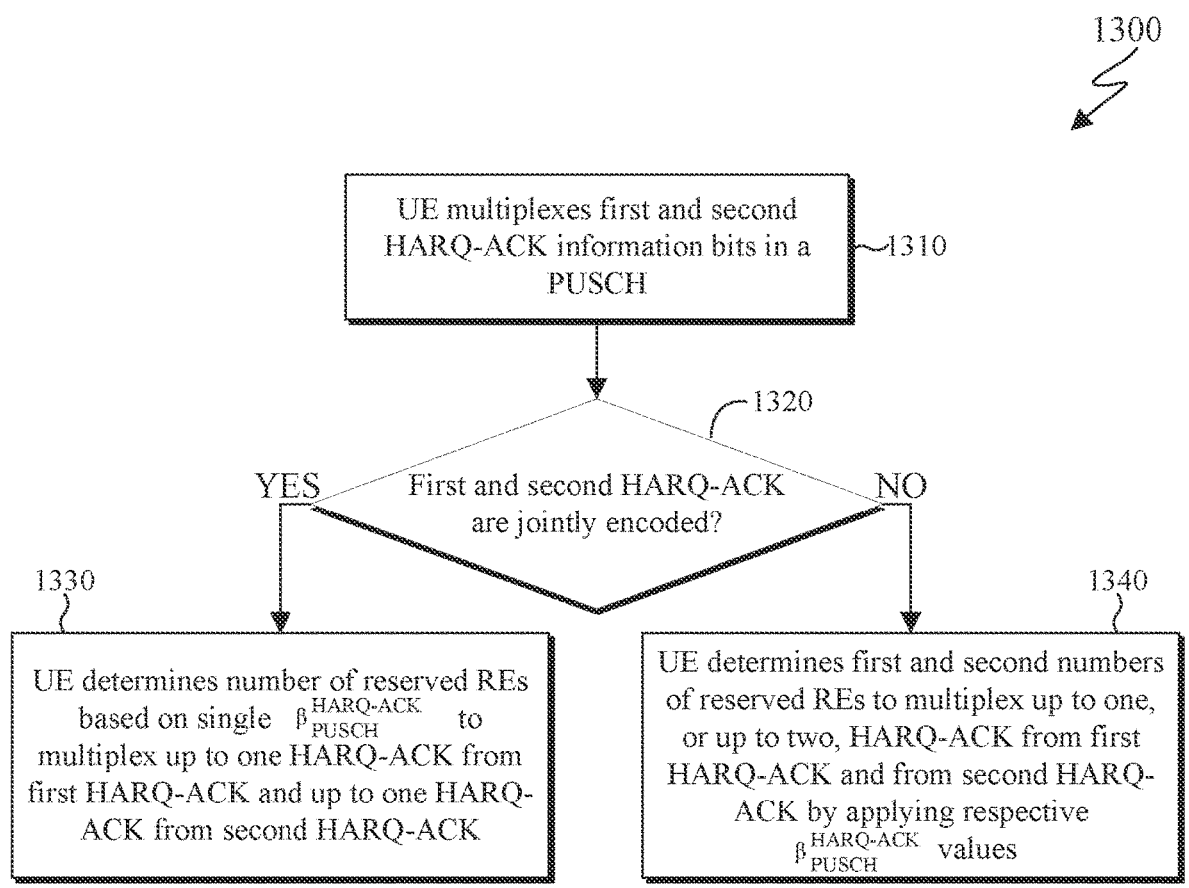
FIG. 13 illustrates an example method for a UE to determine a number of resource elements for multiplexing first and second HARQ-ACK information in a PUSCH according to embodiments of the present disclosure.
Figure 14:
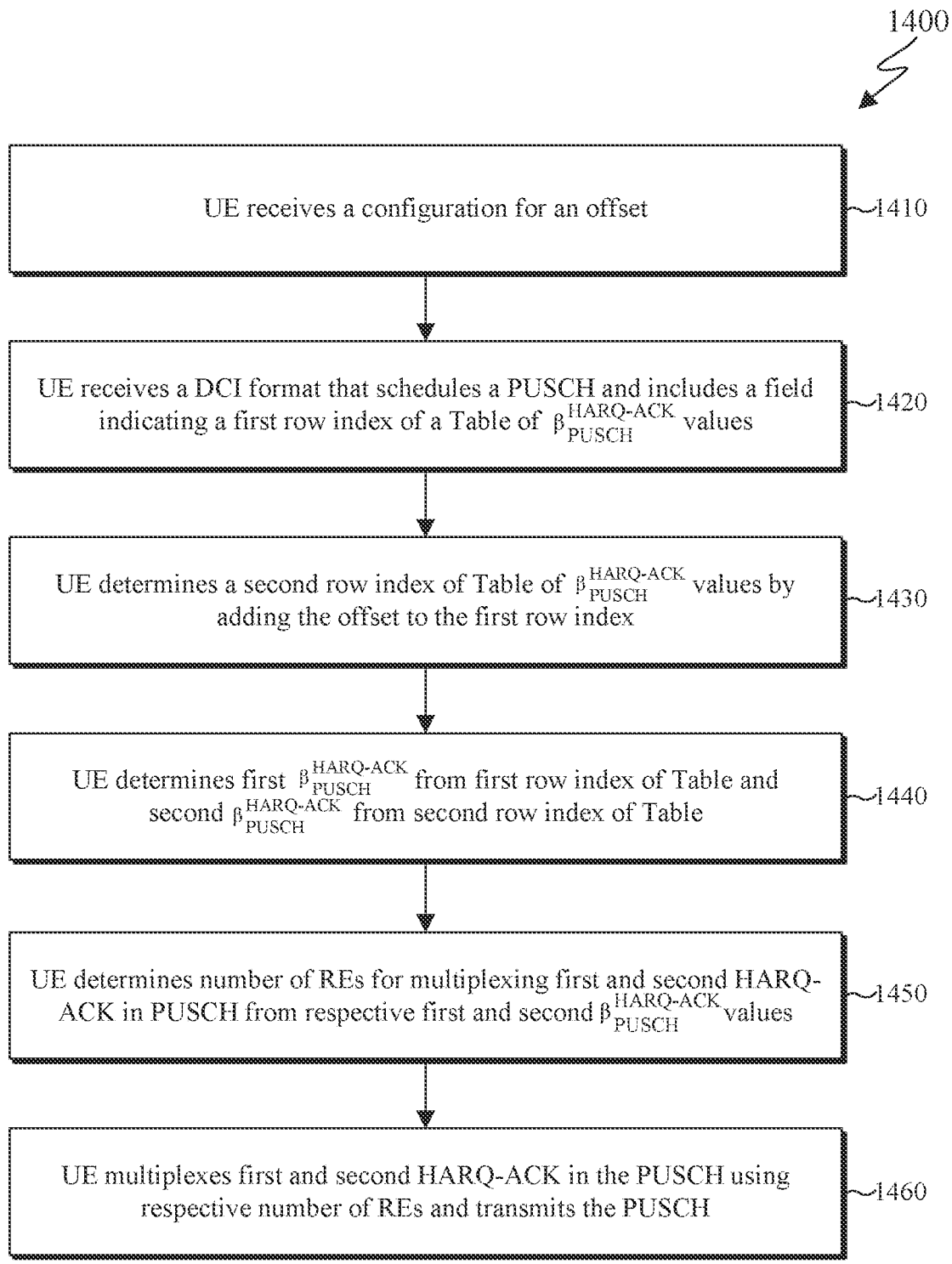
FIG. 14 illustrates an example method for determining first and second $\beta_{PUSCH}^{HARQ-ACK}$ values for computing a number of REs in a PUSCH for multiplexing first and second HARQ-ACK information bits in the PUSCH according to embodiments of the present disclosure.

Accordingly, embodiments of this disclosure, such as those described in FIGS. 12-14 relates to determining a procedure for multiplexing first HARQ-ACK information associated with first DCI formats and second HARQ-ACK information associated with second DCI formats in a PUSCH transmission. The disclosure also relates to determining a number of reserved resource elements in a PUSCH for multiplexing first HARQ-ACK information associated with first DCI formats and second HARQ-ACK information associated with second DCI formats. The disclosure further relates to determining determine a number of resource elements in a PUSCH for multiplexing first HARQ-ACK information associated with first DCI formats and second HARQ-ACK information associated with second DCI formats.

It is noted that reference to HARQ-ACK information associated with DCI formats scheduling PDSCH receptions is typically with respect to PDSCH receptions but can also be for reception of a SPS PDSCH release or for a DCI format with CRC scrambled by a RNTI associated with scheduling a PDSCH reception that instead indicates dormant/non-dormant active DL BWPs for the UE in a group of cells without scheduling a PDSCH reception or, in general, with a DCI format that generates HARQ-ACK information without scheduling a PDSCH reception.

The term "higher layers" is used to denote control information that a UE is provided in a PDSCH reception, such as RRC or a MAC control element (CE).

Embodiments of the present disclosure describe triggering CSI reports for groupcast PDSCH. This is described in the following examples and embodiments, such as those of FIG. 8. For example, embodiments of this disclosure describe a procedure for a network to trigger and for a UE to provide a CSI report associated with groupcast PDSCH receptions.

Figure 8:
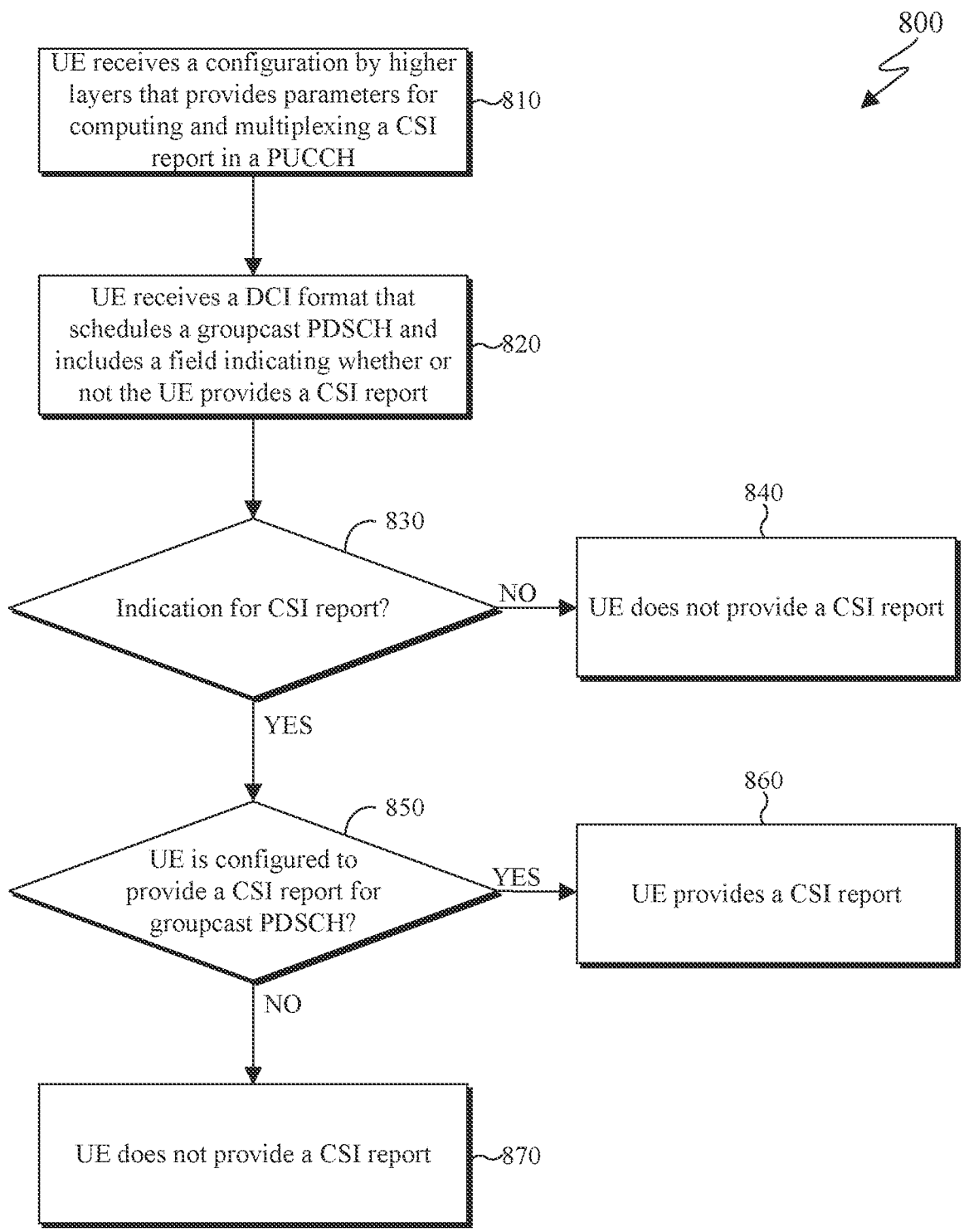
FIG. 8 illustrates an example method for a UE to determine whether to transmit a physical uplink control channel (PUCCH) with a channel state information (CSI) report for a groupcast physical downlink shared channel (PDSCH) reception according to embodiments of the present disclosure.

FIG. 8 illustrates an example method 800 for a UE to determine whether to transmit a PUCCH with a CSI report for a groupcast PDSCH reception according to embodiments of the present disclosure. The steps of the method 800 can be performed by any of the UEs 111-119 of FIG. 1, such as the UE 116 of FIG. 3. The method 800 is for illustration only and other embodiments can be used without departing from the scope of the present disclosure.

A serving gNB (such as BS 102) configures using higher layer signaling a UE (such as the UE 116) whether or not to provide a CSI report for groupcast PDSCH receptions. The configuration may be provided to enable CSI reports. For example, if the configuration is not provided to the UE, CSI reports from the UE for the groupcast PDSCH receptions are disabled. Alternatively, when the network provides the UE a configuration for CSI reports, for example using an information element CSI-ReportConfig as described in REF 5 with an additional characterization/field informing that the CSI report is for groupcast PDSCH receptions, the UE can determine that the UE is enabled to provide a CSI report when such CSI report is triggered/activated by the network.

To avoid a periodic/semi-persistent transmission by the UE of a PUCCH or PUSCH with a CSI report for groupcast PDSCH receptions, the gNB can additionally indicate in a DCI format scheduling a groupcast PDSCH reception whether or not a UE that is configured to provide a CSI report for the groupcast PDSCH reception is enabled to transmit a PUCCH or PUSCH with the CSI report. The configuration by higher layers for the UE to transmit a PUCCH or a PUSCH with a CSI report for a groupcast PDSCH is inactive unless activated by a DCI format scheduling a corresponding groupcast PDSCH reception. The indication can be by a separate field in the DCI format, or by a specific value of another field such as a PUCCH resource indicator field. For example, one value of the PUCCH resource indicator field can be used to indicate to the UE to provide a CSI report in addition to indicating a resource for a PUCCH transmission with HARQ-ACK information in response to a decoding outcome of a TB provided by the groupcast PDSCH reception. Therefore, for some PUCCH resources as configured per UE, a UE provides a CSI report in addition to a HARQ-ACK information report, while for other PUCCH resources the UE only provides a HARQ-ACK information report. The UE can multiplex both the HARQ-ACK information and the CSI report in the indicated PUCCH resource. Alternatively, when the UE is provided such resource by CSI-ReportConfig, the UE can use a separate PUCCH resource to transmit a PUCCH with the CSI report.

The transmission of the PUCCH with the HARQ-ACK information can be in a different slot, such as an earlier slot, than the transmission of the PUCCH with the CSI report. For example, the slot of the PUCCH transmission with the CSI report can be determined based on a corresponding periodicity that is indicated by CSI-ReportConfig or a slot offset relative to the PUCCH transmission with HARQ-ACK information that is indicated by the CSI-ReportConfig or is determined to be an earliest slot available for the PUCCH transmission after a specified or configured time offset.

The indication by the DCI format for UEs to provide a CSI report is applicable for UEs configured by higher layers to provide a CSI report. However, any remaining UEs that receive groupcast PDSCH that is scheduled by the DCI format do not provide a CSI reports. Also, the indication by the DCI format can be applicable for a predetermined number of PUCCH transmissions with the CSI report. For example, the indication by the DCI format can be applicable once or can be applicable for a number of reporting instances that can be provided by CSI-ReportConfig together with a corresponding periodicity. For a SPS PDSCH reception, whether or not a UE provides a CSI report can be indicated by the DCI format activating the SPS PDSCH reception or can be indicated by a DCI format scheduling a retransmission of a TB in a SPS PDSCH reception.

In certain embodiments, the configuration for enabling a UE to provide a CSI report for groupcast PDSCH receptions can be separate from a corresponding configuration for unicast PDSCH receptions and can also be separate per groupcast service type. For example, for a first groupcast service type, the UE is configured to provide a CSI report and for a second groupcast service type the UE is not configured to provide a CSI report. The UE can determine a groupcast service type based on an RNTI scrambling a CRC of the DCI format scheduling the groupcast PDSCH reception, when different RNTIs are used for different groupcast service types, or based on a value of a field in the DCI format scheduling the groupcast PDSCH reception and indicating the groupcast service type.

FIG. 8 illustrates the method 800 describing for a UE to determine whether to transmit a PUCCH with a CSI report for a groupcast PDSCH reception according to this disclosure.

In step 810, a UE (such as the UE 116) receives a configuration by higher layers, such as a CSI-ReportConfig information element. The configuration provides parameters for computing and multiplexing a CSI report in a PUCCH transmission. For example, the configuration can indicate (i) a PUCCH resource for a PUCCH transmission with the CSI report, (ii) a corresponding CQI table, (iii) the reference signals, such as CSI-RS configurations, used by the UE to compute the CSI report, (iv) the contents of the CSI report, and (v) the like. If a same CSI-ReportConfig is used to configure a CSI report for both unicast and groupcast PDSCH receptions, the configuration can also indicate that the CSI report is for unicast or for groupcast PDSCH receptions.

In step 820, the UE receives a DCI format that schedules a groupcast PDSCH reception and includes a field indicating whether or not the UE should provide a CSI report. In step 830, the UE determines whether the field indicates to the UE to provide a CSI report.

When the indication does not trigger a CSI report from the UE (as determined in step 830), the UE in step 840, does not transmit a PUCCH with the CSI report. Alternatively, when the indication triggers a CSI report from the UE (as determined in step 830), the UE in step 850, determines whether the UE is configured by higher layers to provide a CSI report for groupcast PDSCH receptions.

When the UE is configured by higher layers to provide the CSI report (as determined in step 850), the UE in step 860, computes a CSI report and multiplexes the CSI report in a PUCCH transmission. Alternatively, when the UE is not configured by higher layers to provide the CSI report (as determined in step 850), the UE in step 870, does not provide a CSI report and does not transmit a corresponding PUCCH.

In certain embodiments, for a UE that has data to transmit, for example as indicated by scheduling request or a buffer status report, a serving gNB triggers a CSI report through a DCI format scheduling a PUSCH transmission from the UE. As PDSCH reception characteristics for a UE, such as a spatial multiplexing rank or a CQI table/MCS table or quasi-collocation properties of transmission points, can be different for a unicast PDSCH reception and for a groupcast PDSCH (as the latter is not specific to the UE), it is beneficial to enable a CSI request field in a DCI format scheduling a PUSCH transmission from the UE to trigger a CSI report for unicast PDSCH reception on a cell, or a CSI report for groupcast PDSCH reception on the cell, or both CSI reports for unicast and groupcast PDSCH receptions on the cell.

In a first approach, a CSI request field can map to trigger states configured by higher layers, such as by a parameter aperiodicTriggerStateList that is used to configure a UE with a list of aperiodic CSI trigger states, that include a CSI report for groupcast PDSCH receptions. Based on a CSI request field value associated with a trigger state, the UE performs measurements of CSI-RS, CSI-IM and/or SS/PBCH and provides CSI reports according to all entries of a configuration provided by higher layer parameter, such as associatedReportConfigInfoList, for that trigger state. A CSI report for groupcast PDSCH receptions can be included in an associatedReportConfigInfoList for a CSI request trigger state.

In a second approach, a separate, second, CSI request field maps to trigger states configured by higher layers, such as by aperiodicTriggerStateList-MBS, that include only CSI reports for groupcast PDSCH receptions. Based on a second CSI request field value associated with a trigger state, the UE performs measurements of CSI-RS, CSI-IM and/or SS/PBCH and provides CSI reports according to all entries of a configuration provided by a higher layer parameter, such as associatedReportConfigInfoList-MBS, for that trigger state.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also describe an indication of an information element providing configurations for PDSCH reception. This is described in the following examples and embodiments, such as those of FIGS. 9 and 10.

For example, embodiments of this disclosure describe a procedure for a UE to determine an information element providing configurations of parameters for a PDSCH reception and to accordingly interpret fields of a DCI format scheduling the PDSCH reception. The PDSCH receptions can be unicast or groupcast and can correspond to different services or to different priorities of a same service. Although the second embodiment is described with reference to PDSCH receptions scheduled by a DCI format the descriptions are equally applicable for the UE to determine an information element providing configurations of parameters for a PUSCH transmission that is scheduled by a DCI format.

A UE (such as the UE 116) can be provided more than one information elements, PDSCH-Config, providing configurations for parameters/fields of PDSCH receptions wherein a DCI format scheduling a PDSCH reception includes fields with values that indicate a value for some of the parameters/fields in one PDSCH-Config. The DCI format also includes a field with a value that indicates one of the more than one PDSCH-Config that were configured to the UE. When a UE is configured for both groupcast PDSCH receptions and unicast PDSCH receptions, the DCI format scheduling the PDSCH reception can also be used to indicate whether a corresponding PDSCH-Config is for groupcast or unicast PDSCH reception.

Figure 9:
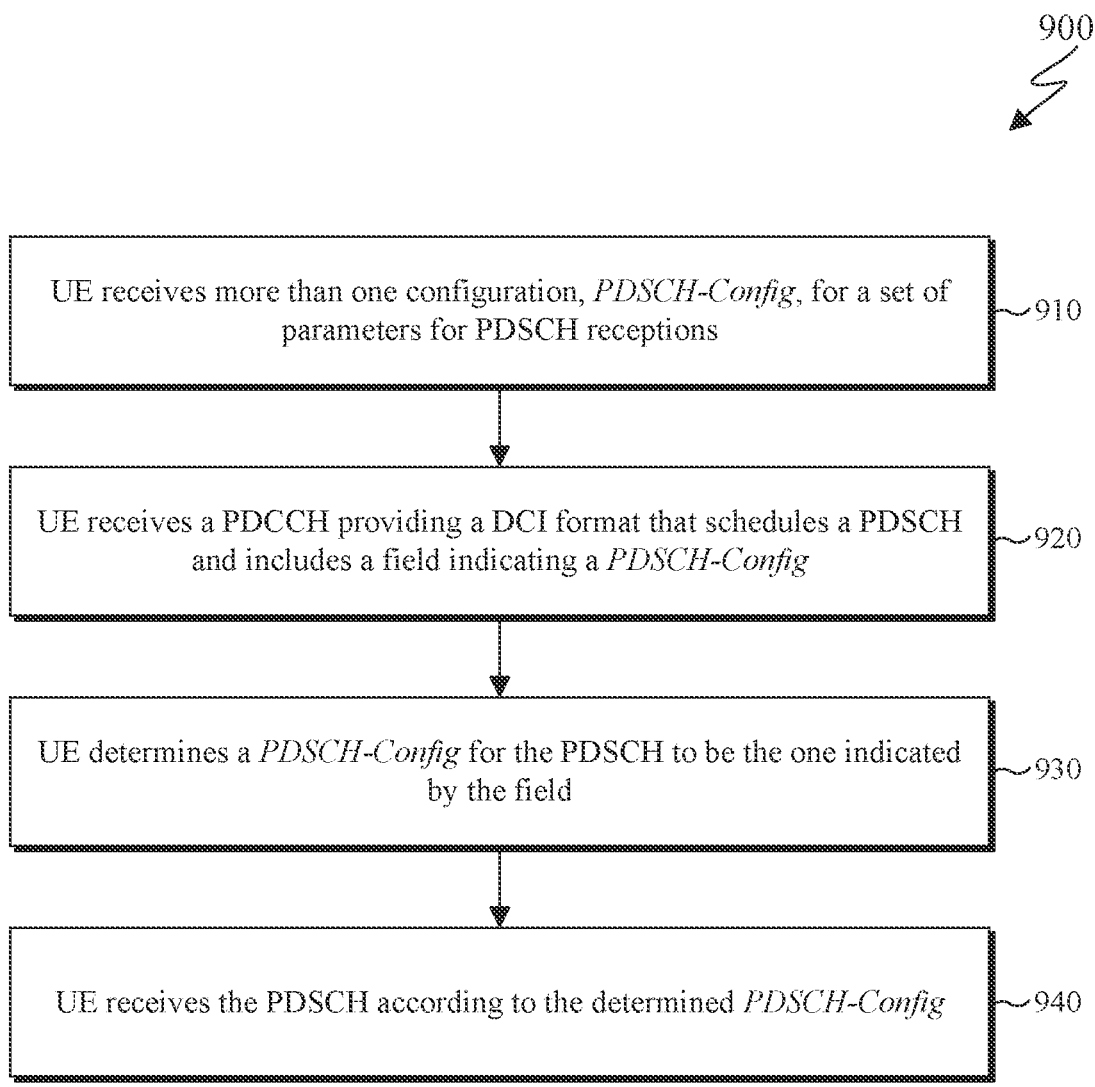
FIG. 9 illustrates an example method for a UE to determine a configuration for more than one configuration for a set of parameters for a PDSCH reception according to embodiments of the present disclosure.
Figure 10:
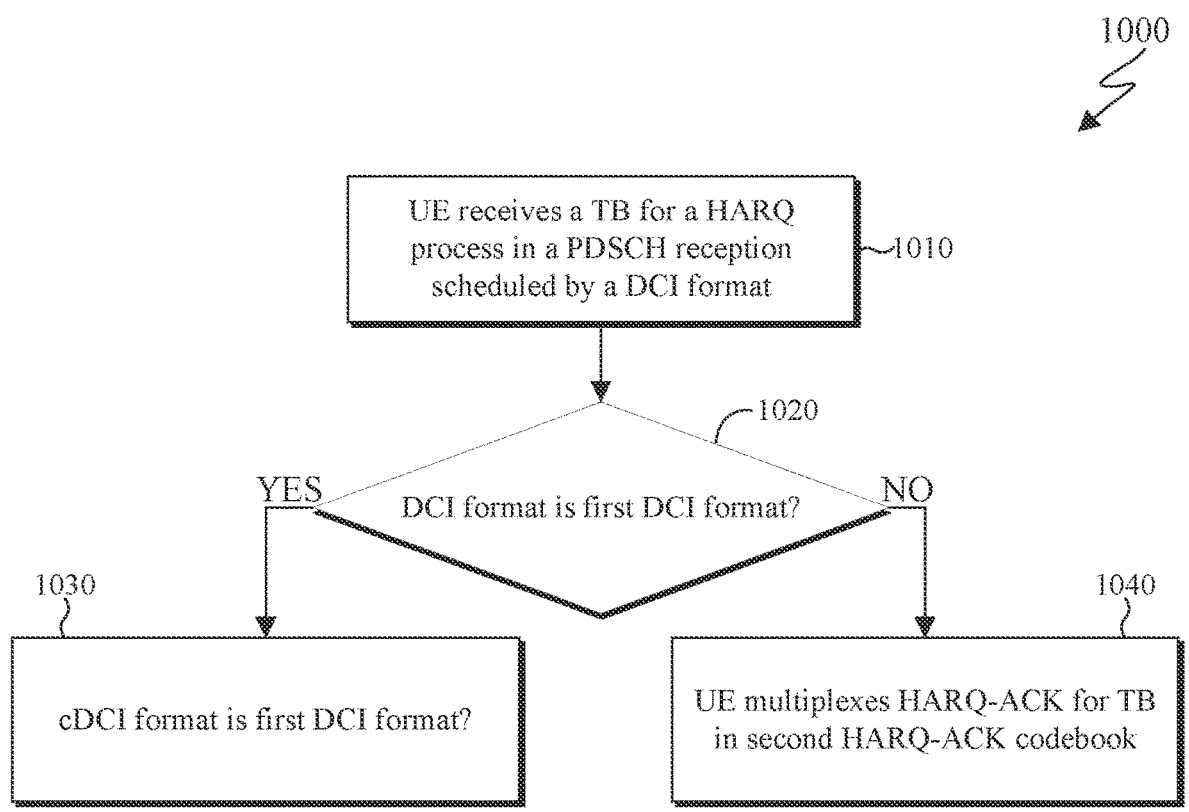
FIG. 10 illustrates an example method for a UE to determine a HARQ-ACK codebook to multiplex HARQ-ACK information for a decoding outcome of a transport block (TB) associated with a HARQ process according to embodiments of the present disclosure.

FIG. 9 illustrates an example method 900 for a UE to determine a configuration for more than one configuration for a set of parameters for a PDSCH reception according to embodiments of the present disclosure. FIG. 10 illustrates an example method 1000 for a UE to determine a hybrid automatic repeat request acknowledgement (HARQ-ACK) codebook to multiplex HARQ-ACK information for a decoding outcome of a transport block (TB) associated with a HARQ method according to embodiments of the present disclosure. The steps of the method 900 of FIG. 9 and the method 1000 of FIG. 10 can be performed by any of the UEs 111-119 of FIG. 1, such as the UE 116 of FIG. 3. The methods 900 and 1000 are for illustration only and other embodiments can be used without departing from the scope of the present disclosure.

As illustrated in the FIG. 9, the method 900 describes an example procedure for a UE (such as the UE 116) to determine a configuration for more than one configuration for a set of parameters for a PDSCH reception according to this disclosure.

In step 910, a UE (such as the UE 116) receives by higher layer signaling more than one configuration of an information element, PDSCH-Config, for a set of parameters for PDSCH receptions. In step 920, the UE receives a PDCCH providing a DCI format scheduling a PDSCH reception, wherein the DCI format includes a field with a value indicating a PDSCH-Config from the more than one PDSCH-Config. In step 930, the UE determines a PDSCH-Config for the PDSCH reception to be the one indicated by the value of the field in the DCI format. In step 940, the UE receives the PDSCH according to the determined PDSCH-Config.

It is also possible that a UE (such as the UE 116) receives a PDSCH-Config. Here, the PDSCH-Config includes multiple values for a field and wherein a value for the field is indicated by the DCI format scheduling a PDSCH reception. In general, a PDSCH-Config can include more than one sets of values for a subset of fields in PDSCH-Config, wherein a set of values is indicated by the DCI format scheduling a PDSCH reception and wherein remaining fields in PDSCH-Config have a single value. This approach can be beneficial in reducing higher layer signaling overhead when some fields of a PDSCH-Config do not need to be determined based on an indication by a DCI format scheduling a PDSCH reception. For example, a PDSCH-Config can include a first set of values and a second set of values for fields indicating an MCS table, a time domain allocation, and a CSI-RS configuration for a PDSCH reception while including only one value for a field indicating a rate matching group. Then, depending on the indication by the DCI format, the UE determines the first set of values or the second set of values for the MCS table, the time domain allocation, and the CSI-RS configuration.

In certain embodiments, when a DCI format with CRC scrambled by a C-RNTI (or in general a DCI format used for scheduling unicast PDSCH receptions), schedules a PDSCH reception for a TB associated with a HARQ process, the UE provides corresponding HARQ-ACK information in a same HARQ-ACK codebook with other HARQ-ACK information corresponding to unicast PDSCH receptions. Similarly, when a DCI format with CRC scrambled by a G-RNTI (or in general a DCI format used for scheduling only groupcast PDSCH receptions), schedules a PDSCH reception for a TB associated with a HARQ process, the UE provides corresponding HARQ-ACK information in a same HARQ-ACK codebook with other HARQ-ACK information corresponding to groupcast PDSCH receptions. It is noted that, different DCI formats scheduling PDSCH receptions can be associated with different HARQ-ACK codebooks either by configuration providing a mapping among DCI formats and HARQ-ACK codebooks, or by an indication from a field in the DCI format such as an explicit field or an RNTI, or by an association of a PDCCH providing the DCI format, such as a search space set or a CORESET.

When a gNB (such as the BS 102) schedules an initial transmission of a TB for a HARQ process using a DCI format scheduling groupcast PDSCH transmissions and schedules a retransmission of the TB for the HARQ process using a DCI format scheduling unicast PDSCH transmissions, the UE (such as the UE 116) provides HARQ-ACK information for the TB in a HARQ-ACK codebook associated with groupcast PDSCH receptions for the initial reception of the TB and in a HARQ-ACK codebook associated with unicast PDSCH receptions for the subsequent reception of the TB. For a SPS PDSCH reception, the UE can determine the HARQ-ACK codebook for multiplexing HARQ-ACK information based on the DCI format activating the SPS PDSCH reception. The UE can also determine parameters associated with a PUCCH transmission that provides the HARQ-ACK codebook, such as a PUCCH resource or a transmission power, in a same manner as for determining the HARQ-ACK codebook. A first PUCCH-Config can be associated with a first HARQ-ACK codebook and a second PUCCH-Config can be associated with a second HARQ-ACK codebook.

FIG. 10 illustrates the method 1000 describing a procedure for a UE to determine a HARQ-ACK codebook to multiplex HARQ-ACK information for a decoding outcome of a TB associated with a HARQ process according to this disclosure.

In step 1010, a UE (such as the UE 116) receives a TB for a HARQ process in a PDSCH reception. The UE can determine a DCI format that scheduled the PDSCH reception or a search space set used to receive a PDCCH that provided the DCI format. In step 1020, the UE determines whether the DCI format is a first DCI format or whether the search space set is a first search space set.

When the DCI format is a first DCI format (as determined ins step 1020) the UE in step 1030 multiplexes HARQ-ACK information in response to a decoding outcome for the TB in a first HARQ-ACK codebook. The first DCI format can include (i) a DCI format with CRC scrambled by a first RNTI, (ii) a DCI format of a first size, (iii) a DCI format with an indicator having a first value, or (iv) the search space set is a first search space set.

Alternatively, when the DCI format is a second DCI format (as determined in step 1020) the UE in step 1040, multiplexes HARQ-ACK information in response to a decoding outcome for the TB in a second HARQ-ACK codebook. The second DCI format can include (i) a DCI format with CRC scrambled by a second RNTI, (ii) a DCI format of a second size, (iii) a DCI format with an indicator having a second value, or (iv) the search space set is a second search space set.

It is noted that the UE determines a PUCCH resource and a transmission power for a PUCCH transmission with a HARQ-ACK codebook based on whether the DCI format or the search space set is a first DCI format or search space set or a second DCI format or search space set. For example, the first HARQ-ACK codebook can be associated with a first PUCCH-Config information element and the second HARQ-ACK codebook can be associated with a second PUCCH-Config information element.

In certain embodiments, a PDSCH-Config used for a unicast PDSCH reception that provides a subsequent reception (retransmission) of a TB is the same or different than a PDSCH-Config used for a PDSCH reception that provides an initial reception (initial transmission) of the TB. If a different PDSCH-Config is used, the DCI format scheduling the PDSCH reception is used to identify the PDSCH-Config. For example, when a UE determines that a PDSCH provides a subsequent/non-initial reception of a TB for a HARQ process (DCI format scheduling the PDSCH reception has a value of an NDI field that is not toggled for the HARQ process), the UE determines the applicable PDSCH-Config to be same as for the PDSCH providing the initial reception of the TB. For example, as a first PDSCH providing an initial TB reception can be received from different transmission points than a second PDSCH providing a subsequent reception for the TB, the PDSCH-Config for the first and second PDSCH receptions can be different. Whether or not a UE considers a same PDSCH-Config or different PDSCH-Config for the first and second PDSCH receptions can be configured to the UE by higher layers from a serving gNB.

Although FIG. 9 illustrates the method 900 and the FIG. 10 illustrates the method 1000 various changes may be made to FIGS. 9 and 10. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure also describe multiplexing procedure for CSI report and unicast or groupcast HARQ-ACK information. This is described in the following examples and embodiments, such as those of FIG. 11.

For example, embodiments of this disclosure describe a procedure for a UE to multiplex a CSI report with HARQ-ACK information of a first type, such as unicast HARQ-ACK information, or with HARQ-ACK information of a second type, such as groupcast HARQ-ACK information. In the following, unicast HARQ-ACK information corresponds to PDSCH receptions scheduled by first DCI formats or DCI formats with CRC scrambled by first RNTIs or including an indicator field with a first value or DCI formats provided by PDCCH receptions according to first search space sets or CORESET with a first index, and groupcast HARQ-ACK information corresponds to PDSCH receptions scheduled by second DCI formats or DCI formats with CRC scrambled by second RNTIs or including an indicator field with a second value or DCI formats provided by PDCCH receptions according to second search space sets or CORESET with a second index.

In certain embodiments, a gNB (such as the BS 102) provides a configuration to a UE, for example by a higher layer parameter simultaneousHARQ-ACK-CSI, for multiplexing unicast HARQ-ACK information and CSI reports. When the UE is provided simultaneousHARQ-ACK-CSI and a PUCCH resource for a PUCCH transmission with unicast HARQ-ACK information overlaps in time with a PUCCH resource for a PUCCH transmission with CSI reports, the UE multiplexes the unicast HARQ-ACK information and the CSI reports in a PUCCH resource. Otherwise, the UE multiplexes only the unicast HARQ-ACK information in a PUCCH resource.

The gNB can also provide a configuration to the UE, for example by a higher layer parameter simultaneousHARQ-ACK-CSI-MBS, for multiplexing groupcast HARQ-ACK information and CSI reports. When the UE is provided simultaneousHARQ-ACK-CSI-MBS and a PUCCH resource for a PUCCH transmission with groupcast HARQ-ACK information overlaps in time with a PUCCH resource for a PUCCH transmission with CSI reports, the UE multiplexes the groupcast HARQ-ACK information and the CSI reports in a PUCCH resource. Otherwise, the UE multiplexes only the groupcast HARQ-ACK information in a PUCCH resource.

In certain embodiments, a gNB can also provide a configuration to a UE, for example by a higher layer parameter ackNackFeedbackMode-MBS, for whether or not the UE multiplexes in a same PUCCH resource unicast HARQ-ACK information and groupcast HARQ-ACK information when a PUCCH resource for multiplexing unicast HARQ-ACK information overlaps in time with a PUCCH resource for multiplexing groupcast HARQ-ACK information. For example, when ackNackFeedbackMode-MBS=joint, the UE multiplexes the unicast and groupcast HARQ-ACK information in a PUCCH resource. Similarly, when ackNack-FeedbackMode-MBS=separate, the UE multiplexes only unicast HARQ-ACK information in a PUCCH resource and does not multiplex groupcast HARQ-ACK information in the PUCCH resource.

When a PUCCH resource for multiplexing unicast HARQ-ACK information overlaps in time with a PUCCH resource for multiplexing groupcast HARQ-ACK information and further overlaps in time with a PUCCH resource for multiplexing CSI reports, the UE can determine a PUCCH resource for multiplexing the UCI types by prioritizing simultaneousHARQ-ACK-CSI over simultaneousHARQ-ACK-CSI-MBS based on the following procedure. First, when the UE (i) is provided ackNackFeedbackMode-MBS=joint and (ii) is provided simultaneousHARQ-ACK-CSI, the UE multiplexes unicast HARQ-ACK information, groupcast HARQ-ACK information, and CSI reports in a PUCCH resource regardless of whether or not the UE is provided simultaneousHARQ-ACK-CSI-MBS. Second, when the UE (i) is provided ackNackFeedbackMode-MBS=separate and (ii) is provided simultaneousHARQ-ACK-CSI, the UE multiplexes unicast HARQ-ACK information and CSI reports in a PUCCH resource, and does not multiplex groupcast HARQ-ACK information in the PUCCH resource, regardless of whether or not the UE is provided simultaneousHARQ-ACK-CSI-MBS. Third, when the UE (i) is provided ackNackFeedbackMode-MBS=joint and (ii) is not provided simultaneousHARQ-ACK-CSI, the UE multiplexes unicast HARQ-ACK information and groupcast HARQ-ACK information in a PUCCH resource, and does not multiplex CSI reports in the PUCCH resource, regardless of whether or not the UE is provided simultaneousHARQ-ACK-CSI-MBS. Fourth, when the UE (i) is provided ackNackFeedbackMode-MBS=separate and (ii) is not provided simultaneousHARQ-ACK-CSI, the UE multiplexes only unicast HARQ-ACK information in a PUCCH resource, regardless of whether or not the UE is provided simultaneousHARQ-ACK-CSI-MBS.

Figure 11:
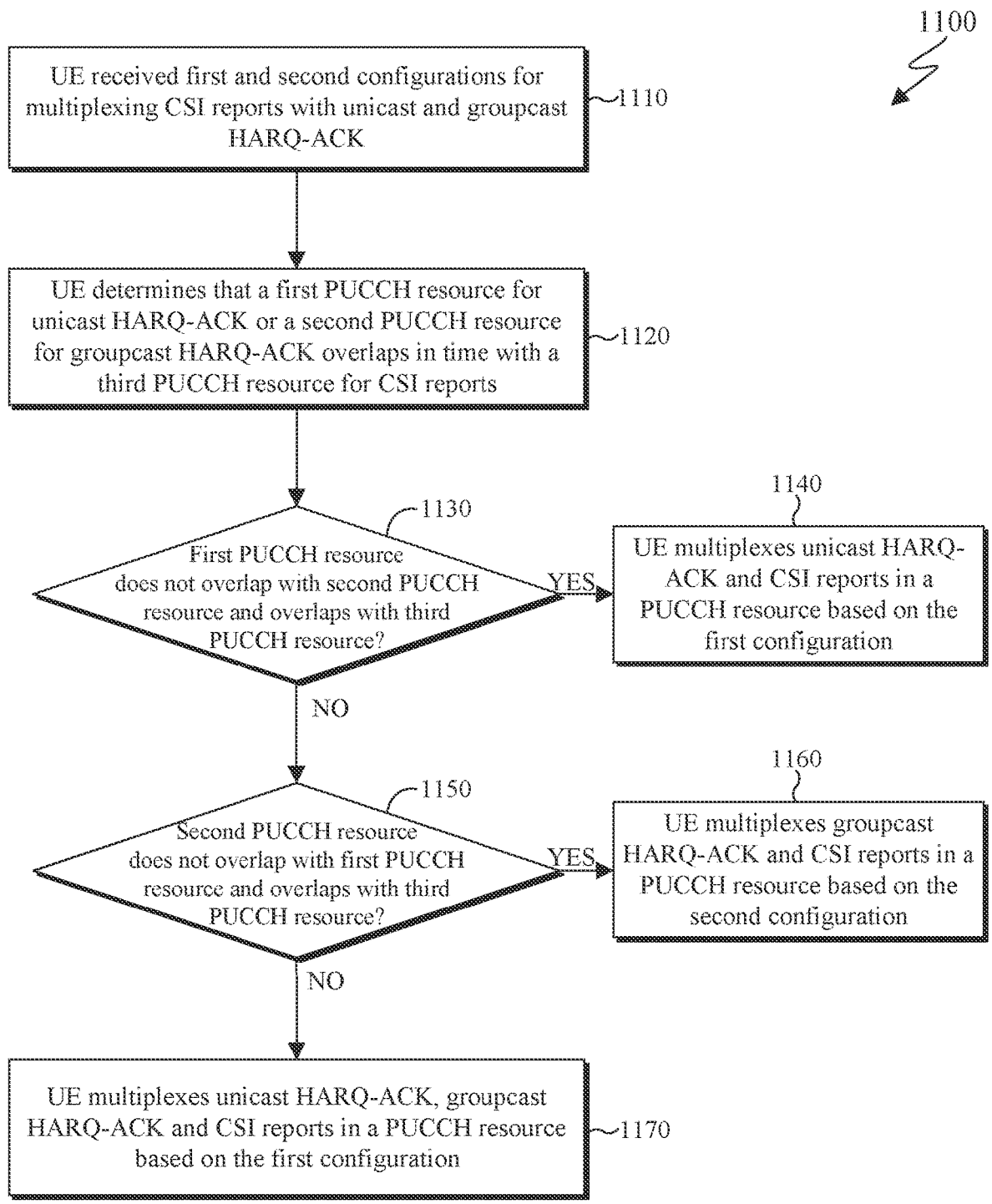
FIG. 11 illustrates an example method for a UE to multiplex a CSI report together with HARQ-ACK information in a PUCCH resource according to embodiments of the present disclosure.

FIG. 11 illustrates an example method for a UE to multiplex a CSI report together with HARQ-ACK information in a PUCCH resource according to embodiments of the present disclosure. The steps of the method 1100 can be performed by any of the UEs 111-119 of FIG. 1, such as the UE 116 of FIG. 3. The method 1100 is for illustration only and other embodiments can be used without departing from the scope of the present disclosure.

In step 1110, a UE (such as the UE 116) receives first and second configurations for multiplexing CSI reports with unicast and groupcast HARQ-ACK information, respectively. The UE is also configured to multiplex unicast and groupcast HARQ-ACK information in a PUCCH resource when corresponding PUCCH resources overlap in time. In step 1120, the determines that in a slot, a first PUCCH resource for multiplexing unicast HARQ-ACK information or a second PUCCH resource for multiplexing groupcast HARQ-ACK information overlaps in time with a third PUCCH resource for multiplexing CSI reports. In step 1130, the UE determines whether the first PUCCH resource does not overlap in time with the second PUCCH resource and overlaps in time with the third PUCCH resource.

In response to a determination that the conditions of step 1130 are satisfied, the UE in step 1140, multiplexes unicast HARQ-ACK information and CSI reports in a PUCCH resource based on the first configuration. Alternatively, in response to a determination that the conditions of step 1130 are not satisfied, the in step 1150, the UE determines whether the second PUCCH resource does not overlap in time with the first PUCCH resource and overlaps in time with the third PUCCH resource.

In response to a determination that the overlapping conditions of step 1150 are satisfied, the UE in step 1160, multiplexes groupcast HARQ-ACK information and CSI reports in a PUCCH resource based on the second configuration. Alternatively, in response to a determination that the overlapping conditions of step 1150 are not satisfied, the UE in step 1170, multiplexes unicast HARQ-ACK information, groupcast HARQ-ACK information, and CSI reports in a PUCCH resource based on the first configuration.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure also describe multiplexing HARQ-ACK information for a first and second DCI formats in a PUSCH. This is described in the following examples and embodiments, such as those of FIG. 12.

For example, embodiments of this disclosure describe procedures for multiplexing first HARQ-ACK information corresponding to first DCI formats with CRC scrambled by an RNTI from a first set of RNTIs and second HARQ-ACK information corresponding to second DCI formats with CRC scrambled by an RNTI from a second set of RNTIs.

In certain embodiments, a UE (such as the UE 116) is configured by higher layers a first set of RNTIs, such as a C-RNTI, MCS-C-RNTI, or CS-RNTI, for scrambling a CRC of a DCI format scheduling PDSCH receptions and a second set of RNTIs, such as a number of G-RNTIs or G-CS-RNTIs, for scrambling a CRC of a DCI format scheduling PDSCH receptions. DCI formats with CRC scrambled by an RNTI from the first set of RNTIs and are associated with HARQ-ACK information from the UE will be referred to as first DCI formats, such as unicast DCI formats. DCI formats with CRC scrambled by an RNTI from the second set of RNTIs and are associated with HARQ-ACK information from the UE will be referred to as second DCI formats, such as multicast DCI formats. It is also possible that an association of a DCI format with first DCI formats or with second DCI formats is determined based on a value of field in the DCI format providing a corresponding indication or based on a size of the DCI format. For brevity, the following descriptions assume an RNTI-based association.

A UE (such as the UE 116) is assumed to provide first HARQ-ACK information associated with first DCI formats and second HARQ-ACK information associated with second DCI formats. For construction of first and second HARQ-ACK codebooks for the first and second HARQ-ACK information, respectively, the first and second HARQ-ACK codebooks can be restricted to be same type, such as Type-1 or Type-2, or the type of the second HARQ-ACK codebook can be independent of a type for the first HARQ-ACK codebook. Further, the first and second HARQ-ACK codebooks can be jointly coded or can be separately coded.

When the first and second HARQ-ACK codebooks are both of Type-1 and are jointly coded, such as when a priority value is same, a single Type-1 HARQ-ACK codebook can be constructed based on a union of sets of slot timing values and on a union of sets of row indexes for TDRA tables for PDSCH receptions associated with the first and second DCI formats. Alternatively, a single set of slot timing values and of row indexes for TDRA tables can be configured to the UE for PDSCH receptions associated with the first and second DCI formats. When the UE multiplexes first and second HARQ-ACK information in a PUSCH, a DCI format scheduling the PUSCH transmission can include a 1-bit DAI field with a value indicating whether or not the UE should multiplex a Type-1 HARQ-ACK codebook corresponding to the union of sets of slot timing values and the union of sets of row indexes for TDRA tables for PDSCH receptions associated with the first and second DCI formats. The 1-bit field can be applicable to both the first and second HARQ-ACK information/codebook or, as is subsequently considered, the field can include 2 bits where the first bit is applicable to the first HARQ-ACK information/codebook and the second bit is applicable to the second HARQ-ACK information/codebook.

When the first and second HARQ-ACK codebooks are both of Type-1 and are separately coded, such as when a priority value is different, each of the two HARQ-ACK codebooks is constructed based on corresponding sets of slot timing values and of row indexes for TDRA tables for PDSCH receptions associated with corresponding DCI formats. When a UE (such as the UE 116) multiplexes first and second HARQ-ACK information in a PUSCH, a DCI format scheduling the PUSCH transmission can include a 2-bit DAI field, wherein the first binary value of the DAI field indicates whether or not the UE should multiplex the first Type-1 HARQ-ACK codebook in the PUSCH and the second binary value of the DAI field indicates whether or not the UE should multiplex the second Type-1 HARQ-ACK codebook in the PUSCH.

When the first and second HARQ-ACK codebooks are both of Type-2, are jointly coded or separately coded, and are multiplexed in a PUSCH transmission scheduled by a DCI format that includes a DAI field, the DAI field can comprise of a first number of bits indicating a total number of first DCI formats (modulo the maximum value represented by the first number of bits) corresponding to the first HARQ-ACK codebook and a second number of bits indicating a total number of second DCI formats (modulo the maximum value represented by the second number of bits) corresponding to the second HARQ-ACK codebook. The first and second numbers of DAI bits can be same or different. Equivalently, two separate DAI fields can be defined for the first and second numbers of bits.

When the first and second numbers of DAI bits are same, a total number of DAI bits are equally split into the first and second numbers and, when the total number of DAI bits is provided by higher layers, a single parameter is sufficient, for example downlinkAssignmentIndexDCL. When the first and second numbers of DAI bits are different, a partitioning of a total number of DAI bits can be defined in the specifications of the system operation or separate corresponding higher layer parameters can be provided, for example downlinkAssignmentIndexDCI-unicast for the first HARQ-ACK information and downlinkAssignmentIndexDCI-groupcast for the second HARQ-ACK information. For example, when the first number of DAI bits is $N_{DAI,1}^{UL}$ and the second number of DAI bits is $N_{DAI,2}^{UL}$, a number of $Y_1$ first DCI formats is indicated by a value of $(Y_1-1) \bmod 2^{N_{DAI,1}^{UL}}+1$ of the first DAI bits and a number of $Y_2$ second DCI formats is indicated by a value of $(Y_2-1) \bmod 2^{N_{DAI,2}^{UL}}+1$ of the second DAI bits. A UE ignores a value of the first or second DAI bits when the UE does not correctly receive any of the first or second DCI formats, respectively. It is also possible that same DAI bits of the DCI field are applicable to both the first and second Type-2 HARQ-ACK codebooks and a UE generates the first and second Type-2 HARQ-ACK codebooks using a same value of the DAI field in the DCI format scheduling the PUSCH transmission.

When one of the first or second HARQ-ACK codebooks is a Type-1 HARQ-ACK codebook and the other of the first or second HARQ-ACK codebooks is a Type-2 HARQ-ACK codebook, a DAI field in a DCI format scheduling a PUSCH transmission comprises of $N_{DAI}^{UL}+1$ bits, wherein one bit from the $N_{DAI}^{UL}+1$ bits, such as the first bit, is used to indicate reporting of the Type-1 HARQ-ACK codebook and second $N_{DAI}^{UL}$ bits from the $N_{DAI}^{UL}+1$ bits, such as the last $N_{DAI}^{UL}$ bits, are used in the determination of the Type-2 HARQ-ACK codebook. The number of NDI bits can be predetermined in the specifications of the system operation or can be configured by higher layers, for example by downlinkAssignmentIndexDCL. Predetermination or configuration can also depend on the DCI format, wherein for a first DCI format scheduling a PUSCH transmission, a value of NDI is predetermined while for a second DCI format scheduling a PUSCH transmission, a value of $N_{DAI}^{UL}$ is configured by higher layers.

FIG. 12 illustrates an example method for determining a number of DAI bits in a DCI format scheduling a PUSCH transmission corresponding to first and second HARQ-ACK information multiplexed in the PUSCH according to embodiments of the present disclosure. The steps of the method 1200 can be performed by any of the UEs 111-119 of FIG. 1, such as the UE 116 of FIG. 3. The method 1200 is for illustration only and other embodiments can be used without departing from the scope of the present disclosure.

In step 1210, a UE (such as the UE 116) correctly receives a DCI format that schedules a PUSCH transmission and includes a DAI field. In step 1220, the UE is configured to multiplex first HARQ-ACK information associated with first DCI formats and second HARQ-ACK information associated with second DCI formats in the PUSCH. In step 1230, the UE determines whether constructing first and second Type-1 HARQ-ACK code for the first and second HARQ-ACK is configured.

In response to a determination that the UE is configured to construct first and second Type-1 HARQ-ACK code for the first and second HARQ-ACK, the UE, in step 1240, determines whether joint encoding is configured. When joint encoding is enabled (as determined in step 1240), a DAI field in the DCI format comprises of one bit (step 1250). Alternatively, when joint encoding is not enabled (as determined in step 1240), a DAI filed in the DCI format comprises two bits (step 1260). That is, if the UE is configured to construct respective first and second Type-1 HARQ-ACK codebooks for the first and second HARQ-ACK information (step 1230), and if the UE is configured to jointly encode the first and second Type-1 HARQ-ACK codebooks (step 1240), a DAI field in the DCI format comprises of one bit (step 1250). Similarly, if the UE is configured to construct respective first and second Type-1 HARQ-ACK codebooks for the first and second HARQ-ACK information (step 1230), and if the UE is configured to separately encode the first and second Type-1 HARQ-ACK codebooks (step 1240), a DAI field in the DCI format comprises of two bits (step 1260).

Alternatively, if the UE is configured to construct respective first and second Type-2 HARQ-ACK codebooks for the first and second HARQ-ACK information (step 1270), a DAI field in the DCI format comprises of $N_{DAI}^{UL}$ bits, wherein first $N_{DAI,1}^{UL}$ bits from the $N_{DAI}^{UL}$ bits are used in the determination of the first Type-2 HARQ-ACK codebook and last $N_{DAI,2}^{UL}$ bits from the $N_{DAI}^{UL}$ bits are used in the determination of the second Type-2 HARQ-ACK codebook (step 1280). One or more of the values of $N_{DAI}^{UL}$, $N_{DAI,1}^{UL}$, and $N_{DAI,2}^{UL}$ can be separately configured by higher layers or can be predetermined in the specifications of the system operation, such as $N_{DAI,1}^{UL}=N_{DAI,2}^{UL}=N_{DAI}^{UL}/2$.

In response to a determination that the UE is not configured to construct first and second Type-2 HARQ-ACK codebooks for first and second HARQ-ACK (step 1270) indicates that the UE is configured to construct a Type-1 HARQ-ACK codebook for one of the first or second HARQ-ACK information and to construct a Type-2 HARQ-ACK codebook for the other of the first or second HARQ-ACK information. Then in step 1290, a DAI field in the DCI format comprises of $N_{DAI}^{UL}+1$ bits. Here one bit from the $N_{DAI}^{UL}+1$ bits, for example the first bit, is used to indicate reporting of the Type-1 HARQ-ACK codebook and second $N_{DAI}^{UL}$ bits from the $N_{DAI}^{UL}+1$ bits, for example the last $N_{DAI}^{UL}$ bits, are used in the determination of the Type-2 HARQ-ACK codebook.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure also describe PUSCH resource elements for multiplexing first and second HARQ-ACK information. This is described in the following examples and embodiments, such as those of FIGS. 13 and 14.

Embodiments of this disclosure also consider a procedure for determining REs in a PUSCH transmission for multiplexing first HARQ-ACK information corresponding to first DCI formats with CRC scrambled by an RNTI from a first set of RNTIs and second HARQ-ACK information corresponding to second DCI formats with CRC scrambled by an RNTI from a second set of RNTIs. When a number of HARQ-ACK information bits that a UE multiplexes in a PUSCH transmission is at most two, the multiplexing is over a number of reserved REs corresponding to two HARQ-ACK information bits.

When a UE (such as the UE 116) multiplexes first and second HARQ-ACK information in a PUSCH and the first and second HARQ-ACK information is jointly encoded, the UE uses the reserved REs to multiplex up to one HARQ-ACK information bit from the first HARQ-ACK information and up to one HARQ-ACK information bit from the second HARQ-ACK information using QPSK modulation. When the UE is configured to monitor PDCCH only for detection of the first DCI formats, the UE uses the reserved REs to multiplex up to two HARQ-ACK information bits from the first HARQ-ACK information. When the UE is configured to monitor PDCCH only for detection of the second DCI formats, the UE uses the reserved REs to multiplex up to two HARQ-ACK information bits from the second HARQ-ACK information. It is also possible that the UE always uses the reserved REs to multiplex up to two HARQ-ACK information bits from the second HARQ-ACK information regardless of whether or not there is the second HARQ-ACK information.

When a UE (such as the UE 116) multiplexes first and second HARQ-ACK information in a PUSCH and the first and second HARQ-ACK information is separately encoded then, in a first approach, the UE uses the reserved REs to multiplex up to two HARQ-ACK information bits from the first HARQ-ACK information and up to two HARQ-ACK information bits from the second HARQ-ACK information. The number of reserved REs is increased to additionally support multiplexing of two HARQ-ACK information bits from the second HARQ-ACK information. In a second approach, the UE uses the reserved REs to multiplex up to one HARQ-ACK information bits from the first HARQ-ACK information and up to one HARQ-ACK information bits from the second HARQ-ACK information. With the second approach, the number of reserved REs may not increase, for example when a same $\beta_{PUSCH}^{HARQ-ACK}$ value applies for determining first and second number of REs corresponding to the first and second HARQ-ACK information bits. When a different $\beta_{PUSCH}^{HARQ-ACK}$ value applies, for example because a target reception reliability for first HARQ-ACK information is different than for second HARQ-ACK information, a resulting number of REs is smaller or larger than a number REs for multiplexing two HARQ-ACK information bits from the first HARQ-ACK information depending on whether a target reception reliability for second HARQ-ACK information is smaller or larger than a target reception reliability for second HARQ-ACK information, corresponding to a smaller or larger value of $\beta_{PUSCH}^{HARQ-ACK}$ for second HARQ-ACK information than for first HARQ-ACK information, respectively.

FIG. 13 illustrates an example method 1300 for a UE to determine a number of resource elements for multiplexing first and second HARQ-ACK information in a PUSCH according to embodiments of the present disclosure. FIG. 14 illustrates an example method 1400 for determining first and second $\beta_{PUSCH}^{HARQ-ACK}$ values for computing a number of REs in a PUSCH for multiplexing first and second HARQ-ACK information bits in the PUSCH according to embodiments of the present disclosure. The steps of the method 1300 of FIG. 13 and the method 1400 of FIG. 14 can be performed by any of the UEs 111-119 of FIG. 1, such as the UE 116 of FIG. 3. The methods 1300 and 1400 are for illustration only and other embodiments can be used without departing from the scope of the present disclosure.

In step 1310, a UE (such as the UE 116) multiplexes first and second HARQ-ACK information bits in a PUSCH. In step 1320, the UE determines whether the UE jointly encodes or separately encodes the first and second HARQ-ACK information bits.

When the UE jointly encodes the first and second HARQ-ACK information bits, the UE in step 1330 determines a number of reserved REs based on a single $\beta_{PUSCH}^{HARQ-ACK}$ value to multiplex up to one HARQ-ACK information bit from the first HARQ-ACK information bits and up to one HARQ-ACK information bit from the second HARQ-ACK information bits using QPSK modulation. Alternatively, when the UE separately encodes the first and second HARQ-ACK information bits, the UE in step 1340 determines a first number of reserved REs to multiplex up to one, or up to two, HARQ-ACK information bits from the first HARQ-ACK information bits and determines a second number of reserved REs to multiplex up to one, or up to two, HARQ-ACK information bits from the second HARQ-ACK information bits by applying respective $\beta_{PUSCH}^{HARQ-ACK}$ values for determining the first and second numbers of REs.

When first HARQ-ACK information bits and second HARQ-ACK information bits are multiplexed (after modulation to symbols) in a PUSCH and are jointly encoded, a determination of a $\beta_{PUSCH}^{HARQ-ACK}$ value is as for the case that the UE multiplexes only first HARQ-ACK information bits in the PUSCH. When first HARQ-ACK information bits and second HARQ-ACK information bits are multiplexed in a PUSCH and are separately encoded, separate $\beta_{PUSCH}^{HARQ-ACK}$ values apply for determining respective numbers of REs. For indicating a $\beta_{PUSCH}^{HARQ-ACK}$ value by a DCI format, the DCI format can include a field indicating a first $\beta_{PUSCH}^{HARQ-ACK}$ value, by indicating a first row index from a predetermined Table of $\beta_{PUSCH}^{HARQ-ACK}$ values, that is applicable for example to the first HARQ-ACK information bits. A second $\beta_{PUSCH}^{HARQ-ACK}$ value for the second HARQ-ACK information bits can be determined based on an offset to the indicated first $\beta_{PUSCH}^{HARQ-ACK}$ value (offset to the first row index for determining a second two index of the Table), wherein the offset is provided by higher layer signaling. If the offset from the indicated $\beta_{PUSCH}^{HARQ-ACK}$ value is such that a resulting $\beta_{PUSCH}^{HARQ-ACK}$ value for the second HARQ-ACK information bits is smaller than a smallest $\beta_{PUSCH}^{HARQ-ACK}$ value in the Table (resulting row is before the first row of the Table and does not exist) or larger than a largest $\beta_{PUSCH}^{HARQ-ACK}$ value in the Table (resulting row is after the last row of the Table and does not exist), the smallest $\beta_{PUSCH}^{HARQ-ACK}$ value or the largest $\beta_{PUSCH}^{HARQ-ACK}$ value is respectively applicable for the second HARQ-ACK information bits. Alternatively, a field in the DCI format scheduling the PUSCH transmission can include first bits indicating a first $\beta_{PUSCH}^{HARQ-ACK}$ value (first row in the Table) for the first HARQ-ACK information bits and last bits indicating a second $\beta_{PUSCH}^{HARQ-ACK}$ value (second row in the Table) for the second HARQ-ACK information bits.

As illustrated in FIG. 14, the method 1400 describes a procedure for determining first and second $\beta_{PUSCH}^{HARQ-ACK}$ values for computing a number of REs in a PUSCH for multiplexing first and second HARQ-ACK information bits in the PUSCH.

In step 1410, a UE (such as the UE 116) receives by higher layers a configuration for an offset. In step 1420, the UE receives a DCI format that schedules a PUSCH transmission and includes a field indicating a first row index of a predetermined Table of $\beta_{PUSCH}^{HARQ-ACK}$ values. In step 1430, the UE determines a second row index of the predetermined Table of $\beta_{PUSCH}^{HARQ-ACK}$ values by adding the offset to the first row index.

If the addition results to a row index that is negative, the second row index is the smallest row index of the Table. If the addition results to a row index that is larger than the largest row index of the Table, the second row index is the largest row index of the Table. The UE determines in step 1440 a first $\beta_{PUSCH}^{HARQ-ACK}$ value from the first row index of the Table and a second $\beta_{PUSCH}^{HARQ-ACK}$ value from the second row index of the Table.

In step 1450, the UE determines the number of REs for multiplexing the first and second HARQ-ACK information bits in the PUSCH from the respective first and second $\beta_{PUSCH}^{HARQ-ACK}$ values. In step 1460, the UE multiplexes the first and second HARQ-ACK information bits in the PUSCH using the respective number of REs and transmits the PUSCH.

When a UE provides the first HARQ-ACK information, such as unicast HARQ-ACK information, according to a Type-3 HARQ-ACK codebook, as described in TS 38.213 v.16.6.0 "NR; Physical layer procedures for control", the UE can determine whether or not to include the second HARQ-ACK information, such as for multicast PDSCH receptions, together with first HARQ-ACK information based on the HARQ processes associated with the first HARQ-ACK information.

A Type-3 HARQ-ACK codebook can include HARQ-ACK information for all HARQ processes or for a subset of HARQ processes. When the Type-3 HARQ-ACK codebook includes HARQ-ACK information for all HARQ processes, such as for the first HARQ-ACK information, there is no need to also include the second HARQ-ACK information as that would be duplicated information. Then, the UE reports the first HARQ-ACK information and does not report the second HARQ-ACK information in a PUCCH or PUSCH transmission. The same can also apply in general when the HARQ processes associated with the first HARQ-ACK information include the HARQ processes associated with the second HARQ-ACK information and the UE can additionally provide second HARQ-ACK information only for HARQ processes that are not associated with the first HARQ-ACK information.

Although FIG. 13 illustrates the method 1300 and the FIG. 14 illustrates the method 1400 various changes may be made to FIGS. 13 and 14. For example, while the method 1300 is shown as a series of steps, various steps could overlap, occur in parallel, occur in a different order, or occur multiple times. In another example, steps may be omitted or replaced by other steps. For example, steps of the method 1300 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for providing hybrid automatic repeat request acknowledgement (HARQ-ACK) information, the method comprising:
   receiving a downlink control information (DCI) format scheduling transmission of a physical uplink shared channel (PUSCH), wherein the DCI format includes a downlink assignment indicator (DAI) bit associated with first HARQ-ACK information and with second HARQ-ACK information;
   determining to provide:
      the first HARQ-ACK information based on a value of the DAI bit, wherein the first HARQ-ACK information is associated with a first set of radio network temporary identifiers (RNTIs), and
      the second HARQ-ACK information based on the value of the DAI bit, wherein the second HARQ-ACK information is associated with a second set of RNTIs; and
   transmitting the PUSCH, wherein:
      the PUSCH includes the first HARQ-ACK information and the second HARQ-ACK information, and
      the first HARQ-ACK information and the second HARQ-ACK information are associated with a Type-1 HARQ-ACK codebook, and
   wherein the Type-1 HARQ-ACK codebook is determined based on:
      a union of first and second sets of slot timing values for physical uplink control channel (PUCCH) transmissions associated with the first and second HARQ-ACK information, respectively, and
      a union of first and second sets of time domain resource allocation (TDRA) values for receptions of physical downlink shared channels (PDSCHs) associated with the first and second HARQ-ACK information, respectively.

2. The method of claim 1, further comprising encoding jointly the first HARQ-ACK information and the second HARQ-ACK information.

3. The method of claim 1, wherein the first set of RNTIs is associated with unicast communications and the second set of RNTIs is associated with multicast communications.

4. A user equipment (UE) comprising:
   a transceiver configured to receive a downlink control information (DCI) format scheduling transmission of a physical uplink shared channel (PUSCH), wherein the DCI format includes a downlink assignment indicator (DAI) bit associated with first hybrid automatic repeat request acknowledgement (HARQ-ACK) information and with second HARQ-ACK information; and
   a processor operably coupled to the transceiver, the processor configured to determine to provide:
      the first HARQ-ACK information based on a value of the DAI bit, wherein the first HARQ-ACK information is associated with a first set of radio network temporary identifiers (RNTIs), and
      the second HARQ-ACK information based on the value of the DAI bit, wherein the second HARQ-ACK information is associated with a second set of RNTIs,
   wherein the transceiver is further configured to transmit the PUSCH, wherein:
      the PUSCH includes the first HARQ-ACK information and the second HARQ-ACK information, and
      the first HARQ-ACK information and the second HARQ-ACK information are associated with a Type-1 HARQ-ACK codebook, and
   wherein the processor is further configured to determine the Type-1 HARQ-ACK codebook based on:
      a union of first and second sets of slot timing values for physical uplink control channel (PUCCH) transmissions associated with the first and second HARQ-ACK information, respectively, and
      a union of first and second sets of time domain resource allocation (TDRA) values for receptions of physical downlink shared channels (PDSCHs) associated with the first and second HARQ-ACK information, respectively.

5. The UE of claim 4, further comprising:
   an encoder configured to jointly encode the first HARQ-ACK information and the second HARQ-ACK information.

6. The UE of claim 4, wherein the first set of RNTIs is associated with unicast communications and the second set of RNTIs is associated with multicast communications.

7. A base station comprising:
   a transceiver configured to:
      transmit a downlink control information (DCI) format scheduling reception of a physical uplink shared channel (PUSCH), wherein the DCI format includes a downlink assignment indicator (DAI) bit associated with first hybrid automatic repeat request acknowledgement (HARQ-ACK) information and with second HARQ-ACK information, and
      receive the PUSCH, wherein:
         the PUSCH includes the first HARQ-ACK information and the second HARQ-ACK information, and
         the first HARQ-ACK information and the second HARQ-ACK information are associated with a Type-1 HARQ-ACK codebook; and
   a processor operably coupled to the transceiver, the processor configured to determine:
      the first HARQ-ACK information based on a value of the DAI bit, wherein the first HARQ-ACK information is associated with a first set of radio network temporary identifiers (RNTIs), and
      the second HARQ-ACK information based on the value of the DAI bit, wherein the second HARQ-ACK information is associated with a second set of RNTIs,
   wherein the Type-1 HARQ-ACK codebook is based on:
      a union of first and second sets of slot timing values for physical uplink control channel (PUCCH) transmissions associated with the first and second HARQ-ACK information, respectively, and
      a union of first and second sets of time domain resource allocation (TDRA) values for receptions of physical downlink shared channels (PDSCHs) associated with the first and second HARQ-ACK information, respectively.

8. The base station of claim 7, further comprising:
a decoder configured to jointly decode a codeword with the first HARQ-ACK information and the second HARQ-ACK information.

9. The base station of claim 7, wherein the first set of RNTIs is associated with unicast communications and the second set of RNTIs is associated with multicast communications.

* * * * *